United States Patent
Russell

(10) Patent No.: US 6,764,110 B2
(45) Date of Patent: Jul. 20, 2004

(54) REMOTELY PRETENSIONED THREADED TUBULAR CONNECTIONS

(76) Inventor: Larry R. Russell, 3607 Gramercy, Houston, TX (US) 77025

( * ) Notice: Subject to any disclaimer, the term of this patent is extended or adjusted under 35 U.S.C. 154(b) by 0 days.

(21) Appl. No.: 10/133,093

(22) Filed: Apr. 26, 2002

(65) Prior Publication Data

US 2002/0163181 A1 Nov. 7, 2002

Related U.S. Application Data

(60) Provisional application No. 60/288,729, filed on May 4, 2001.

(51) Int. Cl.[7] .................................................. F16B 4/00
(52) U.S. Cl. ....................... 285/381.1; 285/18; 285/391; 285/41; 285/386; 29/447; 29/890.14
(58) Field of Search .......................... 285/18, 920, 391, 285/21.2, 41, 187, 381.1, 386, 392, 905; 29/890.14, 447

(56) References Cited

U.S. PATENT DOCUMENTS

| | | | | |
|---|---|---|---|---|
| 1,831,956 A | * | 11/1931 | Harrington | 285/18 |
| 2,984,899 A | * | 5/1961 | Richter et al. | 29/447 |
| 3,063,143 A | * | 11/1962 | Bodine | 29/447 |
| 3,948,545 A | * | 4/1976 | Bonds | 285/391 |
| 4,124,232 A | * | 11/1978 | Ahlstone | 285/18 |
| 4,185,856 A | * | 1/1980 | McCaskill | 285/18 |
| 4,330,140 A | * | 5/1982 | Hampton | 285/391 |
| 5,433,490 A | * | 7/1995 | Hurd et al. | 285/360 |
| 5,441,310 A | * | 8/1995 | Barrett et al. | 285/18 |

* cited by examiner

Primary Examiner—David Bochna
(74) Attorney, Agent, or Firm—Elizabeth R. Hall

(57) ABSTRACT

This invention is a method and apparatus for making a pressure-containing threaded tubular connection, suitable for remotely operated connection and separation, utilizing electrical heating to reduce the amount of makeup torque required to produce reliable preloading of the connection. One aspect of the present invention comprises: 1) a first hub with male threads on its exterior and having a sealing face and axial flow passage, b) a second hub having an axial flow passage and carrying an annular seal which can be mated with the sealing face of the first hub and mounting a rotatable nut having female threads on its interior and integral nut heating means. After stabbing and initial makeup of the connection, the nut is heated and thereby expanded in a controlled manner and the connection retightened. Following cooling, the structural connection is fully preloaded and the annular seal fully compressed so that it seals. Reversing the procedure permits disconnection.

44 Claims, 18 Drawing Sheets

REMOTELY PRETENSIONED THREADED TUBULAR CONNECTIONS

CROSS-REFERENCE TO RELATED APPLICATION

The present application, pursuant to 35 U.S.C. 111(b), claims the benefit of the earlier filing date of provisional application Serial No. 60/288,729 filed May 4, 2001, and entitled "Method and Apparatus for Making a Pressure-Containing Threaded Tubular Connection Using Electrical Heating with Pretensioning."

BRIEF DESCRIPTION OF THE INVENTION

The present invention relates in general to a method and apparatus for securing pressure-containing threaded tubular connections in remote or hazardous locations. More particularly, the invention relates to a method and apparatus for using electrical heating to remotely pretension pressure containing threaded tubular connections.

BACKGROUND OF THE INVENTION

Tubular connections for containing high pressure are widely used by industry, and a very large number of different types have been developed for specific needs. Several types based upon threaded connections are used frequently in oilfield applications. One very common type of connection used for pipes has tapered threads and relies upon interference between the male and female threads when the connection halves are screwed together. The National Pipe Thread (NPT) commonly used in the United States belongs to this first type of connection. This type of connection requires high makeup and breakout torques and liberal lubrication for even small sizes.

A second type of threaded connection utilizes the interference fit of a transverse sealing shoulder on each side of the connection where the annular shoulders are forced together as the threads are made up. This second type of connection can use either integral threads so that the sealing shoulders must be rotated relative to each other or a nut on one side can be used to avoid relative rotation of the sealing shoulders. Standard American Petroleum Institute (API) drill pipe threads are a typical example of a relatively rotating seal of this second type of connection. For large sizes, very high makeup torques and ample lubrication are required. This type of connection can be modified to use an annular face seal in a groove in one of the comating sealing shoulders either as the only seal or as a secondary seal. Certain types of seals such as elastomers or metal C-rings or metal O-rings do not require high compression loads to achieve sealing, but high interfacial preloads may be needed in order to resist high tensile or bending loadings transferred across the connection. Another type of modification for this type of seal uses an intermediate annular seal washer which is compressed between the two transverse sealing faces.

A third type of connection is similar to the second, but uses the interference fit of comating conical faces to achieve sealing. Again, the connection can have either relative rotation or no relative rotation. This type of connection is frequently used in oilfield tubing and casing. The torques to achieve sealing are somewhat reduced, but the hoop stresses adjacent the comating conical surfaces must be controlled by limiting the interference fit. Again, the torques are only somewhat reduced and good lubrication is still required.

A fourth type of screwed connection uses a seal ring in an annular groove on a cylindrical surface of a first connection half to achieve radial sealing between the grooved part and a comating cylindrical surface on the second connection half. The seal can be elastomeric, such as an O-ring or a C-ring, or the seal can be a metal O-ring or some other metal-to-metal seal. This type of connection does not require much lubrication or high makeup torques unless high loadings must be resisted across the connection. The seal for this type of connection can be either rotating or nonrotating relative to its comating surface.

Another type of connection uses flanges having multiple bolts or studs and nuts in a bolt circle pattern to pull the two sides of the connection together and achieve sealing. API or ANSI flanges are examples of this type of connection. Either annular face seals with or without intermediate gaskets or annular wedging interference fit seals such as conical faced ring gaskets are typically used. Lubrication is not as severe a problem as for the first, second, and third connection types. However, even though the torques required to makeup or breakout the fasteners are less than those for a single thread pair joint, they can still be substantial. Further, unpredictable variations of friction makes obtaining uniform bolting preloads unlikely, thereby impairing joint reliability.

The basic problem with all these types of connections when they are used to transmit high loadings as well as seal high pressures is the need to accurately control the makeup torque and friction of the threads so that a predictable value of joint preload can be obtained. This is essential, even for cases where the seal does not require high preload, so that the connection can resist bending moments and the threads of any connections are not subject to large magnitude load cycling with attendant metal fatigue. Unfortunately, such predictability is very hard to obtain, and the predictability becomes much less when the connections are made remotely in a difficult environment, such as sub sea. When the connection must be repeatedly made up and broken out remotely, joint torque predictability and, hence, connection and seal reliability become very problematic. For such situations, thread galling, seal damage, misalignment, and the need for very high torques further complicate the problem.

What is urgently needed is a new type of high pressure, high load connection which can be made up and broken out repeatedly without significant risk of failure and without the need for very high torques. Avoidance of seal damage, thread damage, alignment problems, reduced sensitivity to lubrication problems, and general improvements in reliability are strongly needed. Improvements in connection behavior predictability will result if these needs are met. These requirements become particularly critical for remote connections where general robustness of the connection is essential and the connection must be adaptable to widely varying and difficult installation conditions with only limited informational feedback to the installer.

SUMMARY OF THE INVENTION

The invention contemplates a simple, inexpensive device for solving the problems and disadvantages of the prior approaches discussed above. The present invention provides a rapid, reliable and accurate pretensioning of threaded tubular connections in remote locations. The invention is a method and apparatus for making a pressure-containing threaded tubular connection, suitable for remotely operated connection and separation, utilizing electrical heating to reduce the amount of makeup torque required to produce reliable preloading of the connection.

One aspect of the present invention comprises: (1) a first hub having a through bore, an interior end and an external surface, wherein the first hub has a plurality of threads on a portion of the external surface; (2) a second hub having a through bore and a first end; (3) a coupling nut coaxially mounted on the second hub to limit axial movement of the coupling nut along a length of the second hub, wherein the coupling nut has a plurality of internal threads adapted to threadedly engage the threads on the external surface of the first hub, wherein tightening the coupling nut forces the interior end of the first hub towards the first end of the second hub; and (4) heating means for heating the coupling nut; whereby when the coupling nut is heat-expanded less torque is required to tighten or loosen the coupling nut.

Another aspect of the present invention comprises: (1) a first hub having a through bore, a first end and an externally threaded exterior section proximal the first end; (2) a second hub having a through bore, an outer surface, an interior end, and a shoulder opposed to the interior end; (3) a coupling nut having an internally threaded proximal end adapted to threadedly engage the externally threaded exterior section of the first hub, and an internal shoulder distal to the threaded proximal end engaged with the shoulder of the second hub to provide axial and radial position control for said coupling nut, wherein tightening the coupling nut forces the first end of the first hub towards the interior end of the second hub; a heating element attached to said coupling nut; and (4) torquing means for transmitting torque to the coupling nut to tighten or loosen the nut; whereby when the heating element increases the temperature of the coupling nut sufficiently the coupling nut is expanded and less torque is needed to achieve a predetermined pretensioning of the tubular connector.

Yet another aspect of the present invention is a method of prestressing a threaded connection comprising the steps of:

(1) selecting a tubular connector to connect two lengths of tubing, the connector comprising: a first hub having a through bore, an interior end and an external surface, wherein the first hub has a plurality of external threads on a portion of the external surface; a second hub having a through bore and a first end; a coupling nut coaxially mounted on the second hub to limit axial movement of the coupling nut along a length of the second hub, wherein the coupling nut has a plurality of internal threads adapted to threadedly engage the threads on the external surface of the first hub, wherein tightening the coupling nut forces the interior end of the first hub towards the first end of the second hub; and a heating element for heating the coupling nut;

(2) aligning the internal threads of the coupling nut for engagement with the external threads of the first hub;

(3) applying an initial torque to the coupling nut to engage the external and internal threads to form a connection between the first hub and the coupling nut with a first level of tension on the connection;

(4) thermally expanding the coupling nut;

(5) applying a secondary torque to the coupling nut to provide a second level of tension on the connection; and (6) allowing the coupling nut to achieve ambient temperature to achieve a third level of tension on the connection.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

The novel features which are believed to be characteristic of the invention, both as to its organization and methods of operation, together with the objects and advantages thereof, will be better understood from the following description taken in conjunction with the accompanying drawings, wherein.

DETAILED DESCRIPTION OF THE INVENTION

Figure 1:
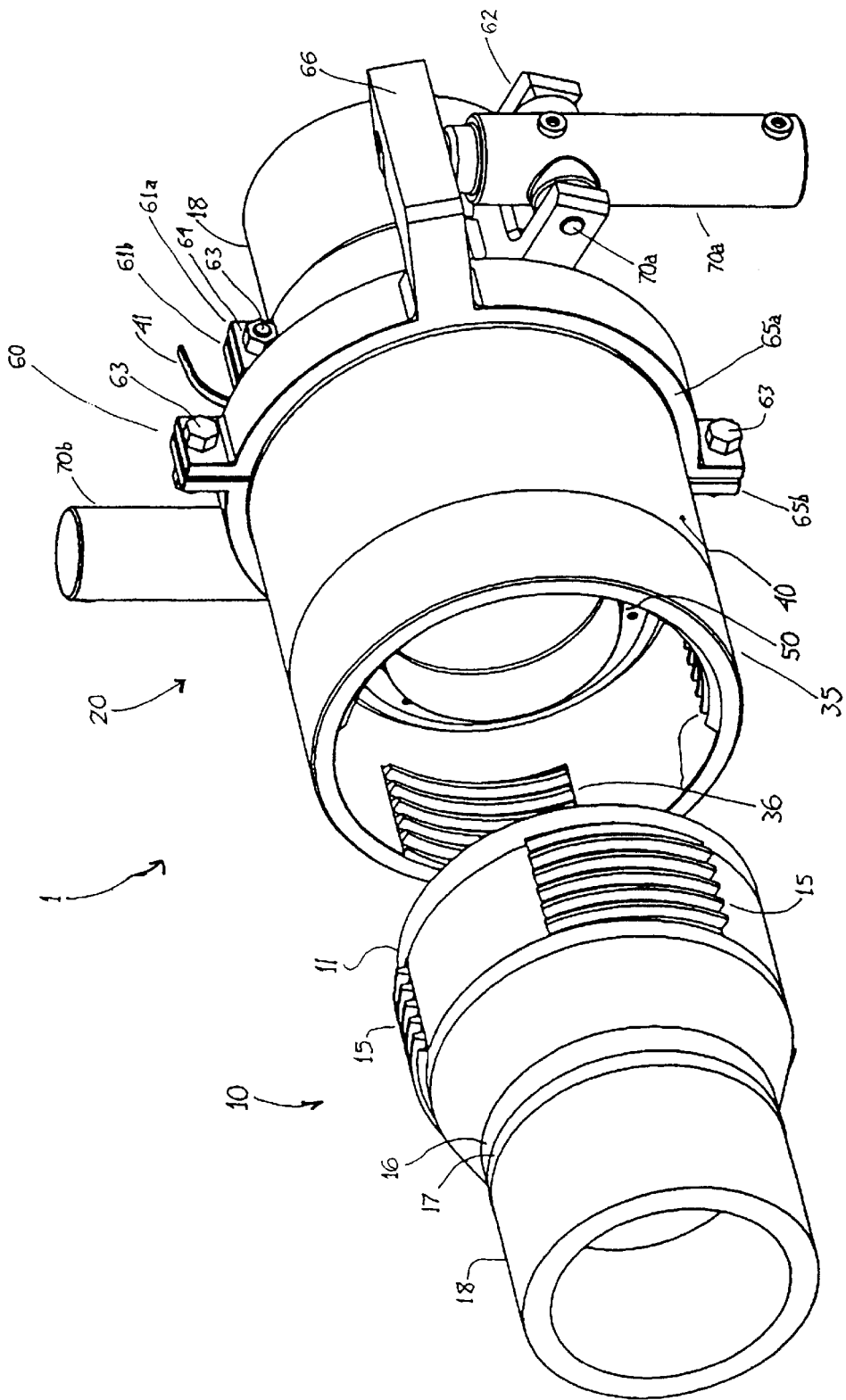
FIG. 1 shows an oblique view of one embodiment of the tubular connector according to the present invention.

The present invention provides a rapid, reliable and accurate pretensioning of threaded tubular connections under hazardous locations. The nut of the tubular connection is preheated to a predetermined temperature above ambient, pretensioned at the increased temperature, and allowed to cool to ambient temperature. Likewise, the tubular connection is easily disconnected by preheating the nut to a temperature sufficiently above ambient to expand the nut. As the nut expands, the tension on the mated threads of the two hubs is relaxed and the nut is easily loosened. The invention is particularly applicable for use in remote applications, such as sub sea, high temperature, hazardous and radiation generating environments.

The connection device of the present invention is shown in different configurations to adapt the connection device for different situations with varying degrees of stabbing misalignment and environmental cleanliness. Three examples, or embodiments, of device configuration are taught in detail. The first embodiment, shown in FIGS. 1–6, is configured for use in conditions where a medium level of misalignment and dirty conditions exist. The second embodiment, FIGS. 7–14, is configured to deal with very significant misalignments and dirty conditions. Whereas, the third embodiment, shown in FIGS. 15–18, is configured for use under conditions with a minor misalignment and relatively clean conditions.

Although the basic design of the connection device is adaptable for low or high pressure requirements, each of the examples below illustrates the use of a seal to render the connector suitable for high pressure. Each of the embodiments is configured to be useable with very reliable metal-to-metal sealing. For each embodiment, additional reliability is easy to provide by means of adding a redundant metal-to-metal or elastomeric face seal on the transverse mating faces. If desired, the stabbing nose of the second embodiment can be provided with a seal for circumferential sealing in an annular groove.

Referring now to the drawings and the specific examples described in detail, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

EXAMPLE 1

The first embodiment of the tubular connector 1 of the present invention is shown in FIGS. 1–6 and FIG. 13A. This embodiment is suitable for applications where the connection axial angular alignment and position for the connection halves are somewhat controlled, as would be the case for vertical makeup in a drilling rig.

As seen in FIG. 1, the tubular connector 1 consists of two hubs, a male side 10 and a female side 20. A length of tubing 18 is connected to the male side 10 and a similar piece of tubing 18 is connected to the female side 20. The tubing 18 is connected to the male and female sides by connection means known to those skilled in the art, preferably by welding. When the two hubs are connected, flow proceeds from the tube connected to the male side 10 through the tube connected to the female side 20. Basically the tubular connector 1 connects the two pieces of tubing, by stabbing the upset male pin 11 into the nut 35 and comating the internal female threads 36 of the nut 35 with the male external threads 15 of the upset male pin 11.

Figure 2:
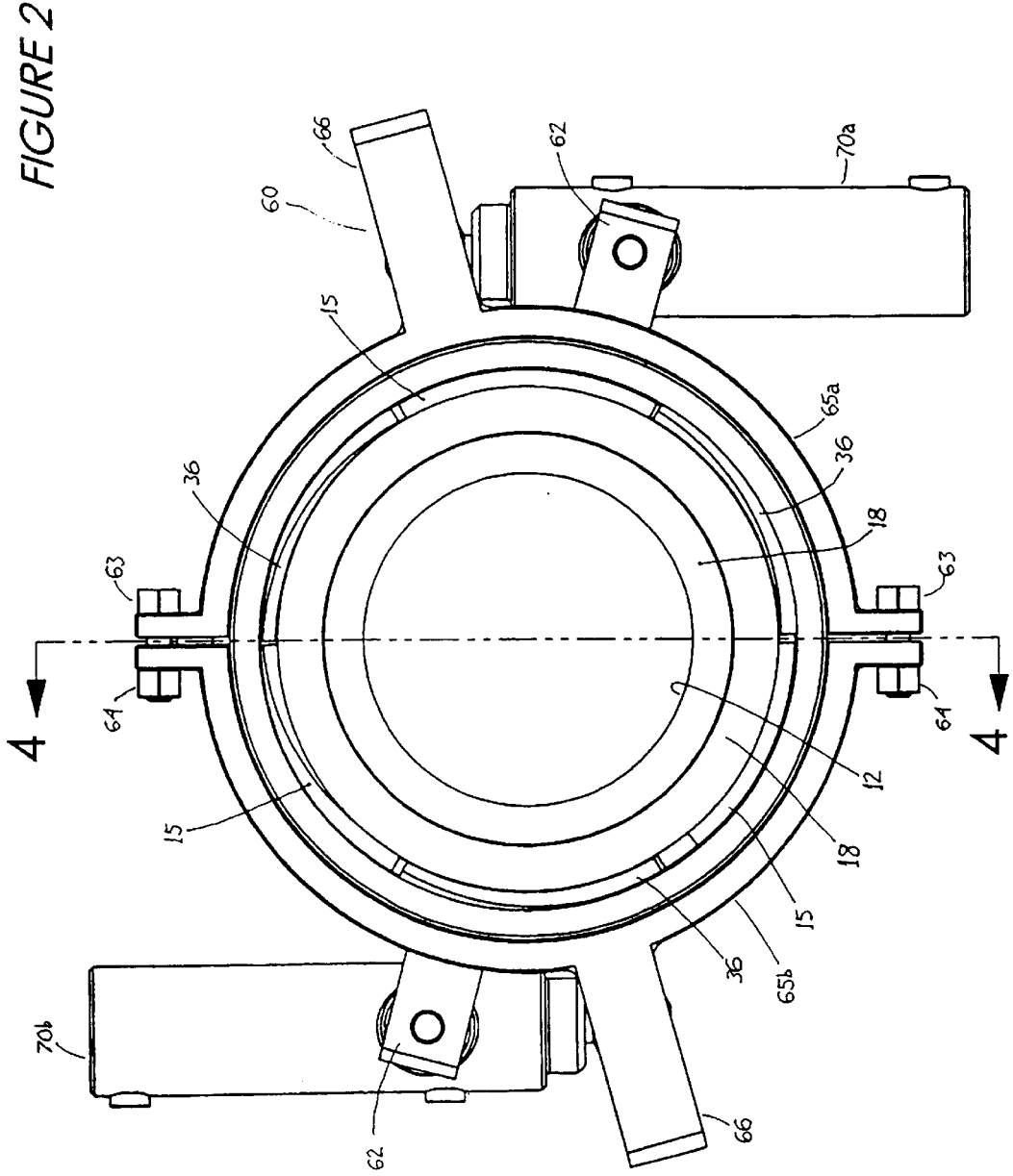
FIG. 2 shows an axial view from the outlet end of the male side of the connector shown in FIG. 1 with the nut in its stabbed but untightened position.
Figure 4:
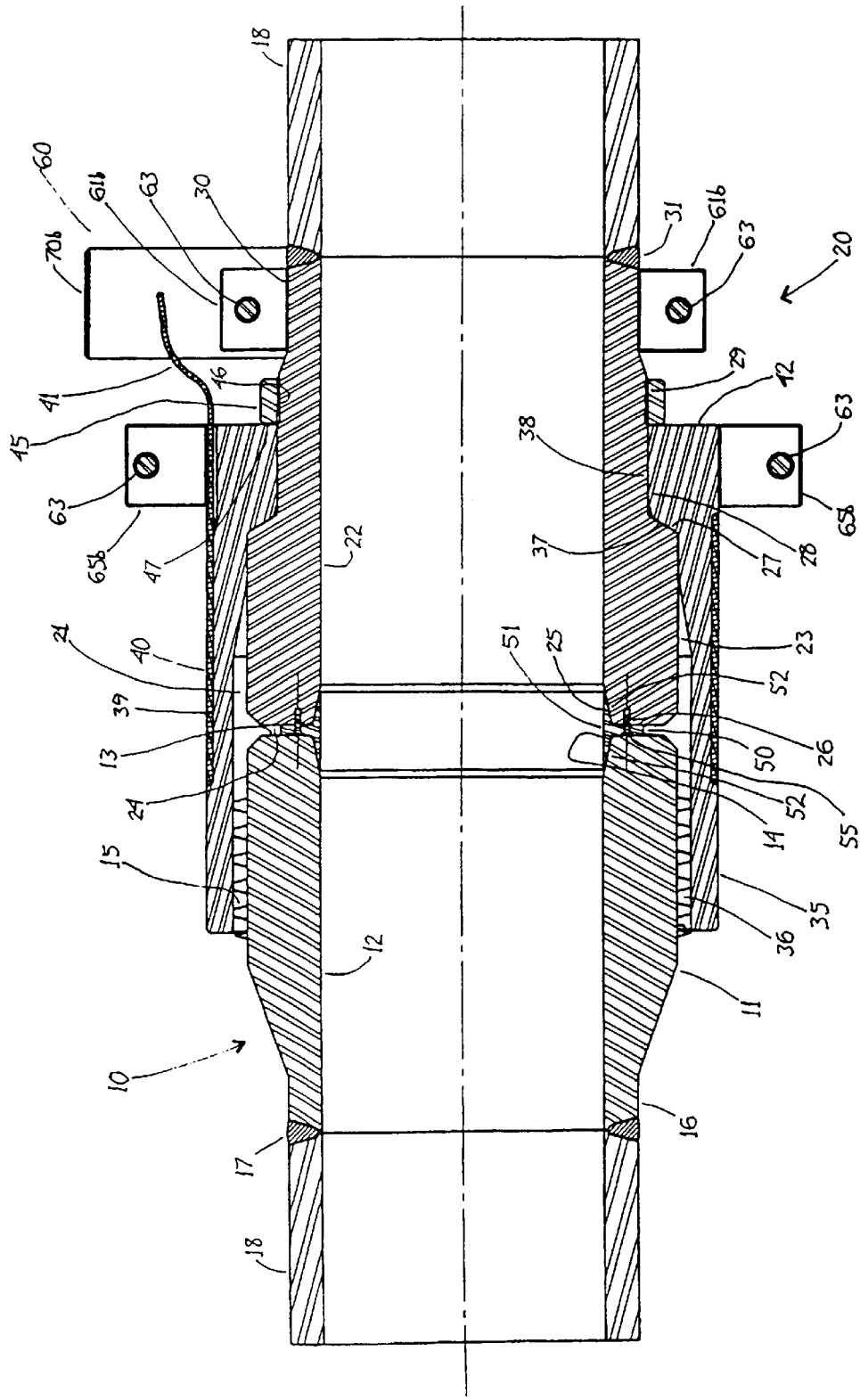
FIG. 4 illustrates a longitudinal sectional view of the stabbed but untightened connector shown in FIG. 1.
Figure 5:
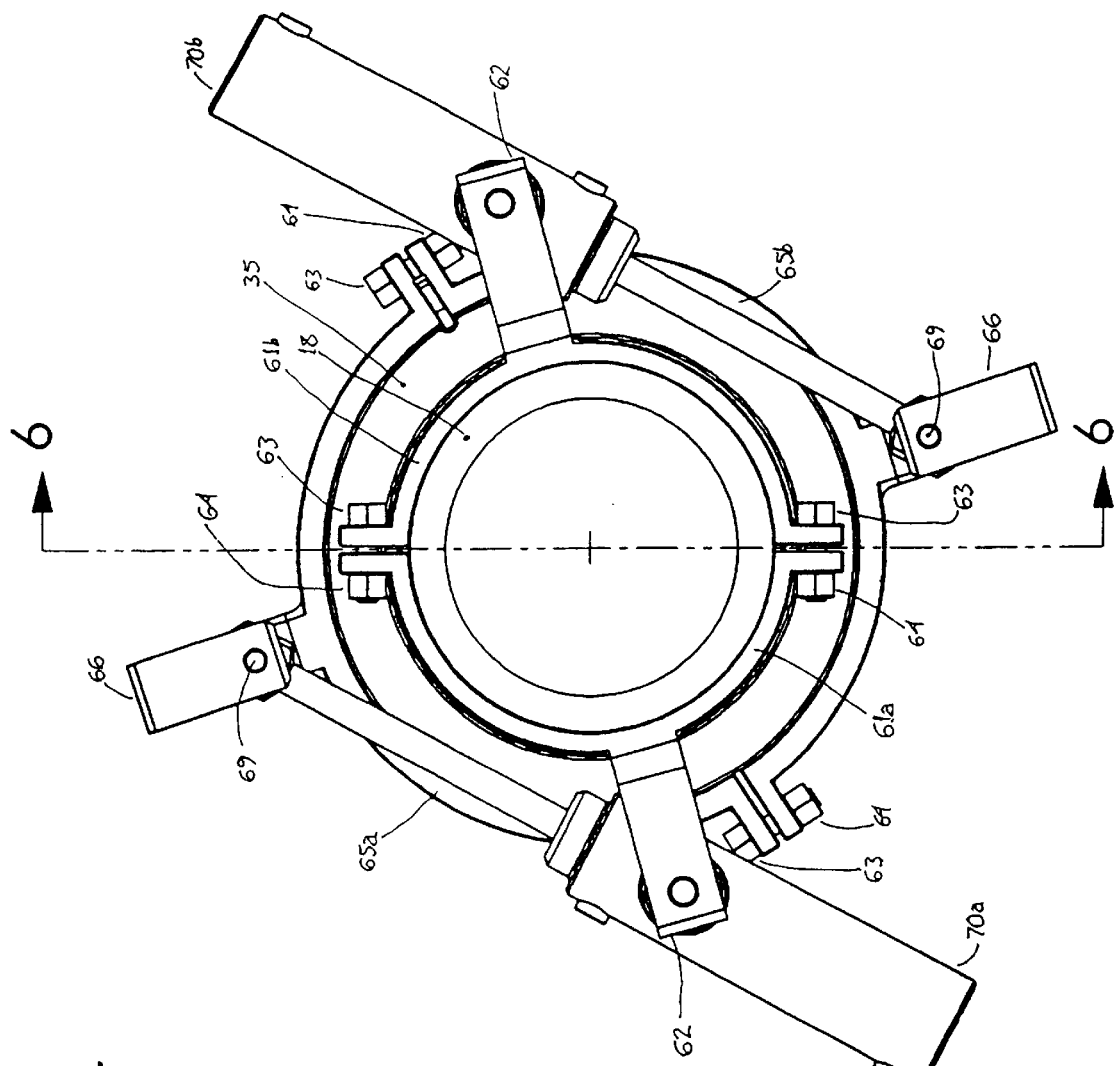
FIG. 5 shows an axial view from the outlet end of the female side of the connector shown in FIG. 1 with the nut in its stabbed and tightened position.
Figure 6:
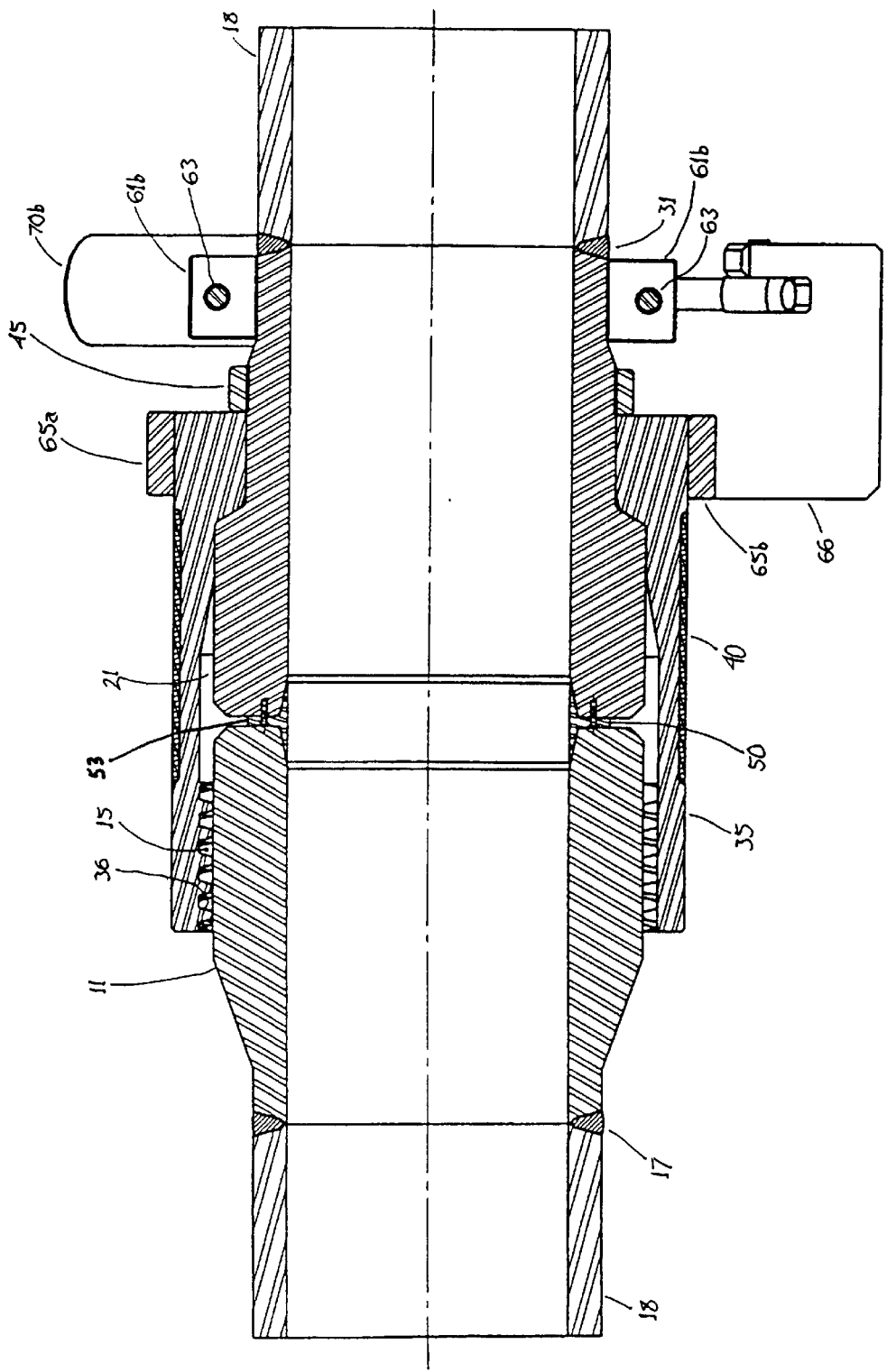
FIG. 6 shows a longitudinal sectional view of the stabbed and tightened connector shown in FIG. 1.

The male side 10, further illustrated in FIGS. 2 and 4, has an externally upset male pin 11 with a through bore 12 and a transverse mating face 13 having conical seal recess 14 formed between bore 12 and face 13. The outside cylindrical surface of pin 11 has male interrupted threads 15. The number of thread starts is equal to the number of thread interrupts. Here, three thread interrupts are used, but another number could be provided. The end of pin 11 obverse to mating face 13 is tapered to a weld neck 16. Circumferential weld 17 joins weld neck 16 to tube 18. Tube 18 is shown as a short segment for purposes of illustration, but typically will be a portion of a pressure containing vessel such as a pipeline.

Figure 3:
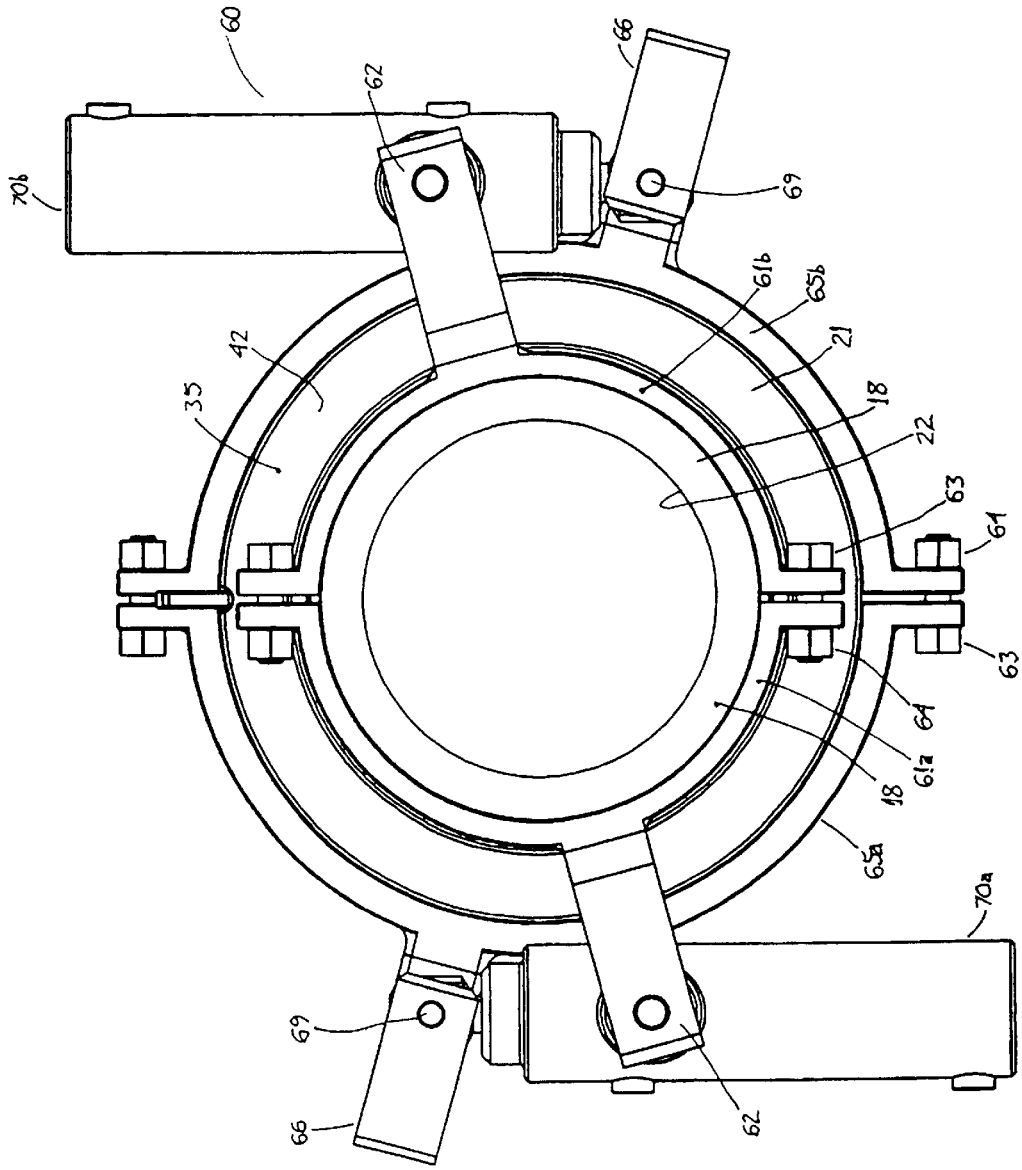
FIG. 3 shows an axial view from the outlet end of the female side of the connector shown in FIG. 1 with the nut in its stabbed but untightened position.

The female side 20, further illustrated in FIGS. 3 and 4, has a nut hub 21 which supports nut 35. Nut hub 21 has a through bore 22, an externally upset cylindrical head 23, and a transverse mating face 24. Conical seal recess 25 is formed at the intersection of bore 22 and transverse face 24 and houses annular seal 50. Multiple drilled and tapped holes 26 permit mounting seal 50 fixedly to face 24 so that seal 50 is integral with nut hub 21. Obverse to mating face 24 and in order of distance from face 24 on the exterior of nut hub 21 is conical abutment shoulder 27 and adjacent cylindrical nut guide surface 28. Adjacent to guide surface 28 is a male thread 29 and weld neck 30. Weld neck 30 is joined by circumferential weld 31 to another connecting tube 18. Note that the sizes of the weld necks and connecting tubes need not be identical for both sides of the connection.

Annular nut 35 has interrupted female threads 36 comatable with the male threads 15 of pin 11 at its outer end. Annular nut 35 has an interior conical shoulder 37 and guide bore 38 at its inner end. Shoulder 37 bears against corresponding shoulder 27 of nut hub 21, while bore 38 mates with guide surface 28 of nut hub 21, thereby controlling axial position and maintaining orientation of the nut 35 relative to nut hub 21. The outside diameter of nut 35 is uniform except for a central annular groove 39 which contains electrical heating element 40. Groove 39 runs parallel to the nut axis and contains the connecting wires 41 of heating element 40. The outer end 42 of nut 35 is transverse to the axis of the nut.

Annular keeper ring 45 retains nut 35 on nut hub 21. The bore of the keeper ring 45 has female threads 46 which are screwed together with male thread 29 of nut hub 21 so that transverse shoulder 47 abuts inner end 42 of nut 35 and thereby retains nut 35 on nut hub 21.

Figure 13A:
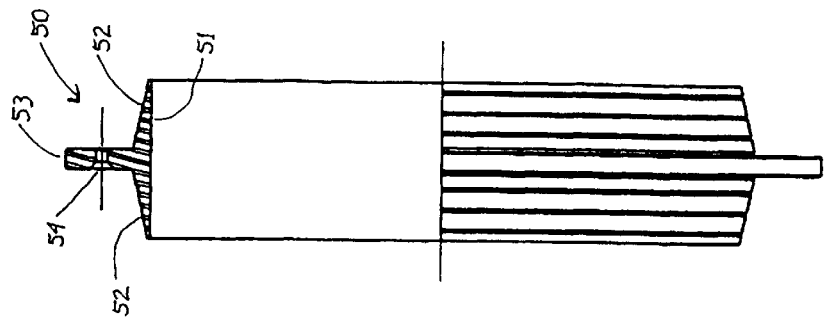
FIG. 13A shows a quarter-sectional transverse view of the seal of the connector shown in FIG. 1.

Seals can be adapted to sealingly engage the male side 10 and the female side 20. When a seal is provided in the tubular connector 1, the seal prevents the ingress or egress of fluid from the tubing 18 connected by the tubular connector 1. An example of such a seal is shown in FIGS. 4 and 13A. Seal 50 has a bore 51 which is internally flush with the through bores 12 and 22 of pin 11 and nut hub 21, respectively. The equally proportioned sealing faces 52 of seal 50 are conical with annular grooves axially spaced on the conical surfaces. The annular wall formed between the bore 51 and a conical sealing face 52 is relatively thin, so that the seal is relatively flexible and pressure responsive to some degree as a consequence. The conical surfaces 52 of seal 50 are made to have a fully elastic mild interference fit with the corresponding seat recesses 14 and 25 of pin 11 and nut hub 21, respectively, when fully inserted into a seat recess. Central flange 53 serves as a stop to prevent excessive, permanent distortion of the conical sealing surfaces from overcompression in the seat recesses 14 and 25. Multiple screw holes 54 in flange 53 comate with holes 26 in the nut hub to permit attachment of seal 50 to the nut hub 21 with flathead screws 55. When seal 50 is fully screwed down on transverse mating face 24 of nut hub 21, sealing engagement occurs between conical seal recess 25 of nut hub 21 and a conical sealing face 52 of seal 50. The seal of this first embodiment is substantially similar to the seal used for Graylok connectors or the G-Con connector offered by the Reflange Company, but with the addition of the grooves and the mounting holes to permit fixing the seal to the nut hub 35. Seal 50 is energized primarily by mechanical compression prestress at its interfaces, but it is additionally pressure energized by the differential across its wall.

A torquing system 60 is provided for engaging or disengaging the threaded nut 35 with the threads 15 of the pin 11. Torquing system 60 comprises of a pair of identical first ring clamp halves 61a,b and a pair of identical second ring clamp halves 65a,b, respectively mounted to the nut hub 21 and the nut 35. Radially projecting from each first ring clamp half 61a,b is a cylinder trunnion mounting bracket 62. The first ring clamp halves 61a,b are bolted together by a pair of bolts 63 and nuts 64 through holes on the radially projecting ears of the ring clamp so that the clamp halves are rigidly fixed to nut hub 21 by friction. If necessary, interlocking keys, welding, or other means can be employed to enhance the torque transmission capabilities of the joint between the clamp halves and the nut hub. Similarly for each second ring clamp half 65a,b, a radially projecting rod pin mount 66 is attached. The second ring clamp halves 65a,b are also connected by a pair of bolts 63 and nuts 64 positioned in holes in radially projecting ears so that they tightly grip the nut 35. Again, the joint between the second ring clamp halves 65a,b and nut 35 may be enhanced by welding, keys, or other means.

A pair of identical hydraulic cylinders 70a,b are tangentially mounted to the ring clamps 61a,b and 65a,b. Cylinders 70a,b are each trunnion mounted in a trunnion mounting bracket 62 on the first ring clamp halves 61a,b and have a pin 69 coupling their rod ends to rod pin mount 66 of the second ring clamp halves 65a,b. The cylinders 70a,b are thus positioned so that when their rods are extended, the nut 35 is rotated to cause it to tighten, while when their rods are retracted, the nut is rotated to cause it to loosen.

The tubular connector 1, described above, is operated in the following manner. Male side 10 and female side 20 are brought into approximate axial alignment as shown in FIG. 1 and then coaxially stabbed together. This connection 1 is able to tolerate mild axial offset and some axial angular misalignment. Although stabbing means are not shown for any of the embodiments described herein, such means are very familiar to those involved with the field of tubular connections. Typically, one side of the connection is held stationary while the other side is caused to axially reciprocate by pipe manipulation, hydraulic cylinders, screw jacks, manual manipulation, or other suitable means. Unless otherwise noted, the hub of the reciprocating side of the connection is also constrained against rotation. Because interrupted threads 15 and 36 are used, the connection of this first embodiment can be fully stabbed before nut 35 is rotated. This is possible by aligning the nut so that its remaining thread segments will fit into the gaps of thread 15 during stabbing. Nut 35 need only rotate a fraction of a revolution to fully engage the interrupted threads of the connection. When the transverse mating faces 13 and 24 are brought into sufficiently close proximity, the projecting conical sealing face 52 of seal 50 engages the conical seal recess 14 to aid in axially centralizing the connection. As the conical sealing face 52 enters the seal recess 14, the grooves aid in screeding trash off the interface, and the multiple annular conical surfaces between the grooves offer redundant seal surfaces.

After the male side 10 and the female side 20 of the connection 1 are substantially or fully stabbed together, hydraulic pressure is applied to cylinders 70a,b to cause their rods to rotate the nut 35 about nut hub 21 so that the female interrupted threads 36 of nut 35 are caused to engage the male interrupted threads 15 of pin 11. The limited amount of rotation of the nut does not damage the heater connecting wires 41, since they are provided with sufficient slack and are routed away from moving parts which might damage them.

After this initial rotation, the connection is in a state of initial makeup. However, due to the limited size and moment arm of the hydraulic cylinders, the axial preload between transverse mating faces 13 and 24 of, respectively, the male 10 and female 20 sides of the connection is insufficient to permit the connection to carry substantial bending moments. Additionally, the threads 15 and 36 will be prone to fatigue damage if not adequately preloaded. Accordingly, electric power is applied to the heating element 40 through connecting wires 41 so that the tensioned tubular section adjacent the heating element 40 between female threads 36 and interior shoulder 37 of nut 35 is heated and thereby expanded. The heating is done until a desired temperature rise and axial extension of the nut 35 is achieved. Although not shown, it is assumed that the heated portion of the nut 35 is provided with sensor means such as a thermocouple, thermistor or resistance-temperature device for accurately gauging the temperature of the nut so that heating can be stopped at the appropriate time. Typically, the temperature and its associated amount of thermal strain (i.e., extension) are chosen to be equal to approximately the strain which would be produced if the nut were torqued until its axial tension were at a desired fraction (e.g., half) of the yield stress for the nut. After attainment of this desired temperature, the hydraulic cylinders 70*a,b* are repressured to retorque the threads 15 and 36, which are loosened when the nut 35 is heated. When the nut is cooled after the electric power to heating element 40 is turned off, the connection 1 will be fully tightened and properly pretensioned so that fatigue is avoided and large bending moments can be transmitted across the connection. Following the cooling and pretensioning of the connection, the connection is also able to hold high pressure fluid flow.

Connection 1 is disconnected by first applying heat to nut 35 with the heating element 40 so the nut reaches the same or a somewhat higher temperature than used in tightening. After the nut is stretched sufficiently to reduce the friction on the threads 15 and 36, hydraulic pressure is applied to cause cylinders 70*a,b* to fully retract to thereby fully disconnect the interrupted threads. At that point, the connection can be unstabbed.

EXAMPLE 2

The second embodiment of the pressure containing tubular connection of this invention and its components are shown in FIGS. 7–14. This embodiment is particularly suited for situations when the connection axial angular alignment and relative position are poorly controlled during stabbing. A typical application for this connection would be a remotely made sub sea pipeline pull-in connection.

Figure 7:
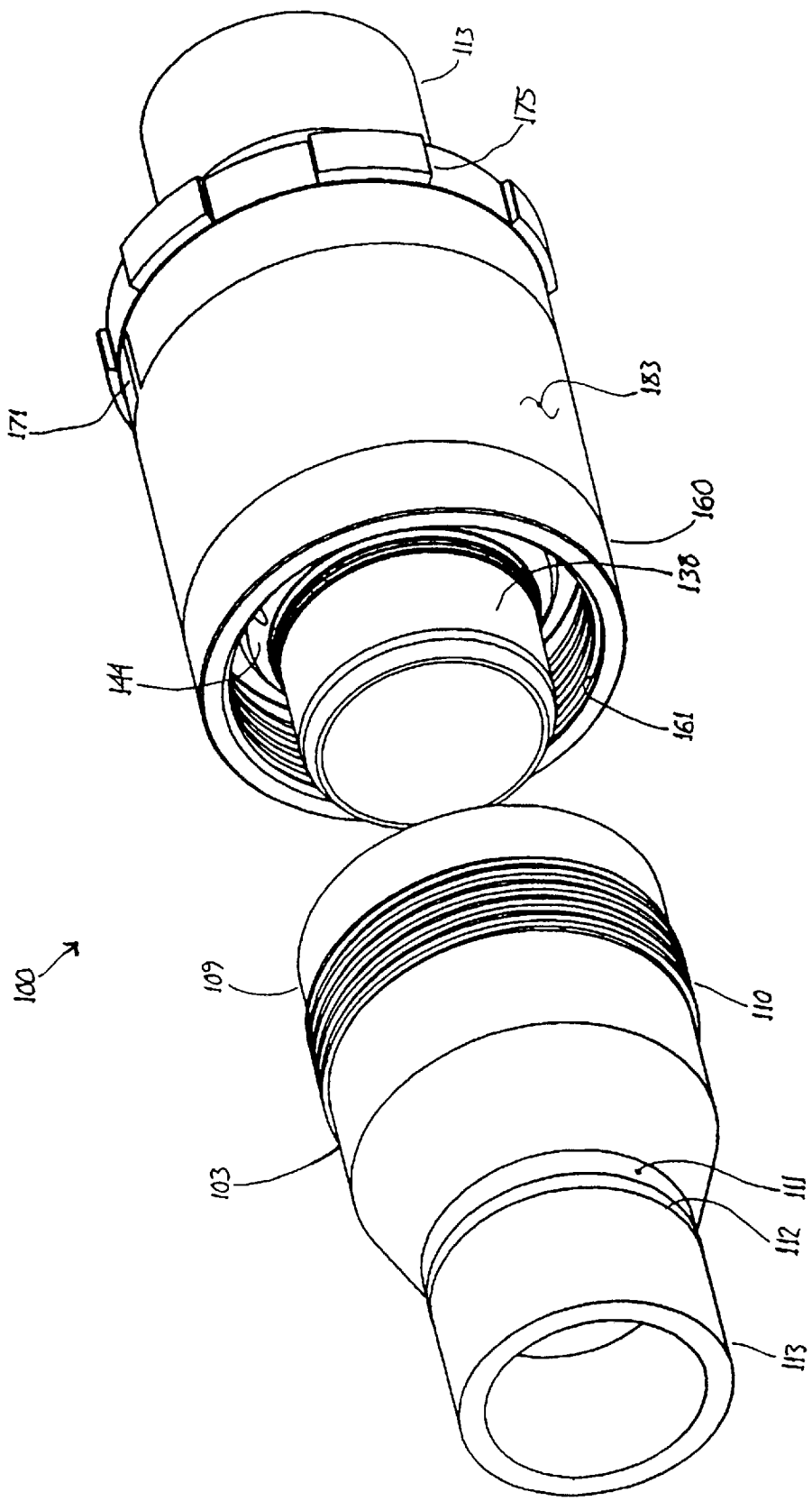
FIG. 7 shows an oblique view of a second embodiment of the tubular connector according to the present invention.
Figure 8:
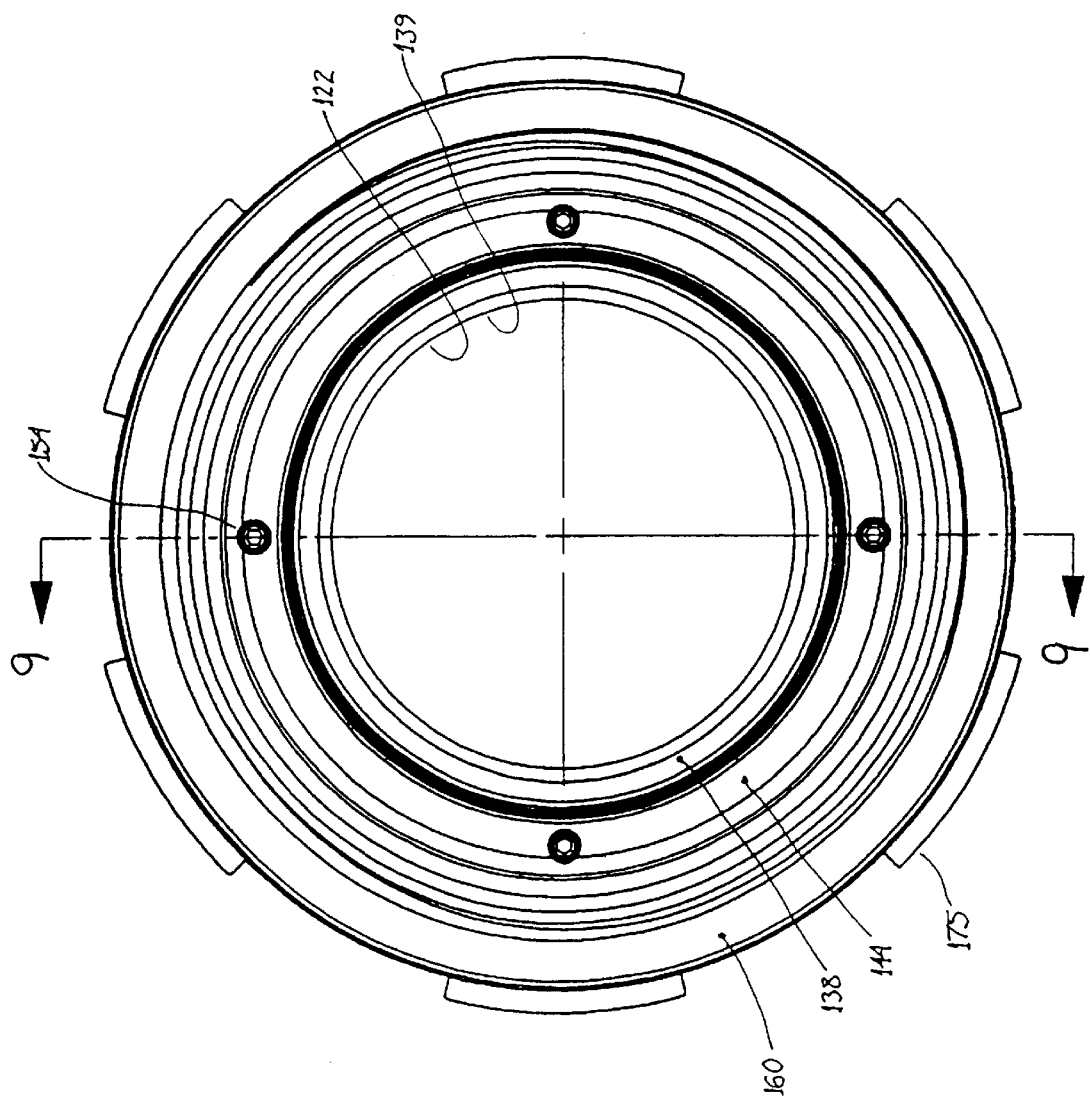
FIG. 8 shows an axial view from the outlet end of the female side of the connector shown in FIG. 7 prior to stabbing.
Figure 10:
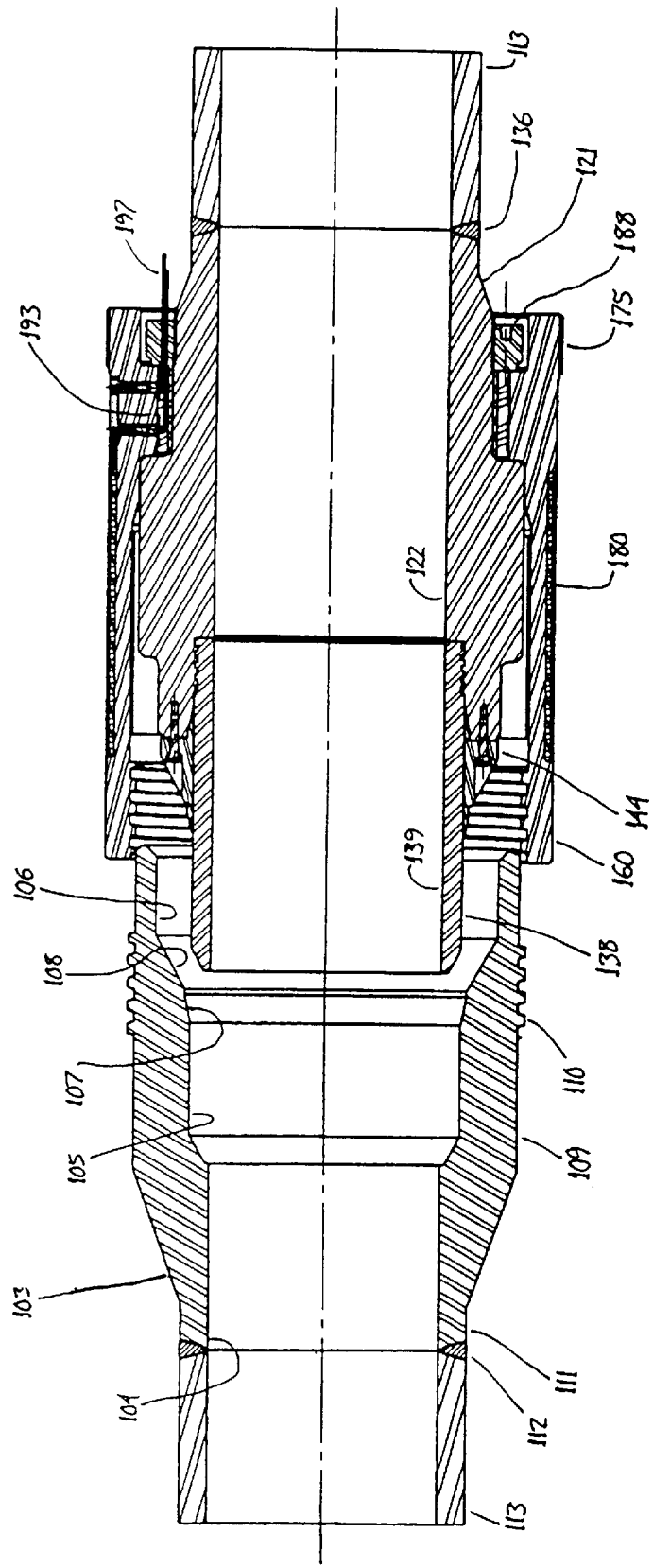
FIG. 10 shows a longitudinal sectional view of the connector shown in FIG. 7 as stabbing is initiated.

As seen in FIG. 7, the tubular connector consists of a male side 102 and a female side 120. In FIG. 10, it can be seen that the male side 102 has an externally upset male pin 103 with a through bore 104, a first counterbore 105, and a second counterbore 106. Located between first counterbore 105 and second counterbore 106 is conical seal recess 107 and a larger diameter conical abutment 108 which has a larger flare angle than seal recess 107. On its exterior, pin 103 has cylindrical outer surface 109 on which continuous male thread 110 is positioned approximately in the middle. On the outer end of pin 103 is weld neck 111, where tube 113 is joined to weld neck 111 by circumferential weld 112. Tube 113 is shown as a short segment for purposes of illustration, but typically will be a portion of a pressure containing vessel such as a pipeline.

Figure 9:
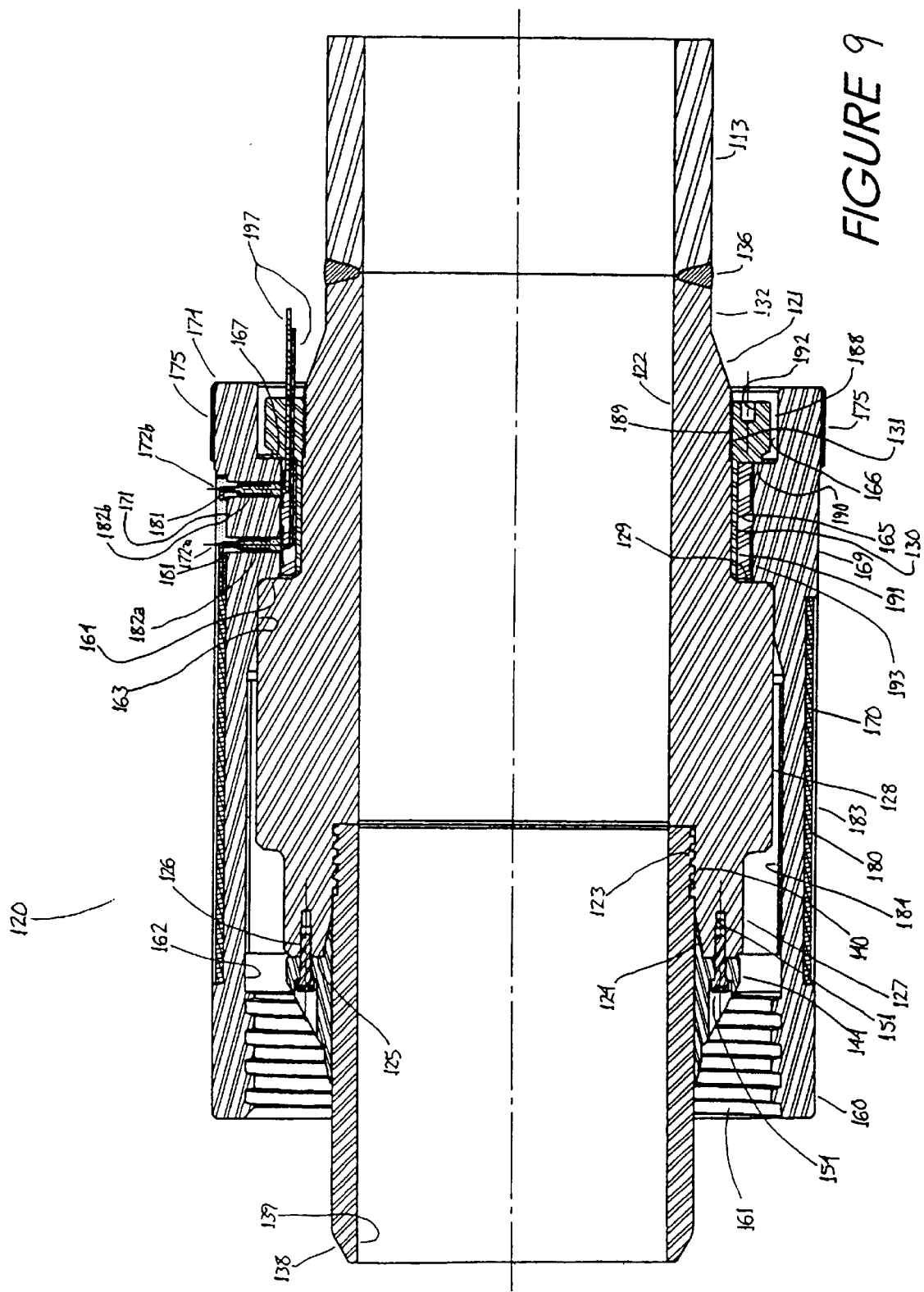
FIG. 9 is a longitudinal sectional view of the female side of the connector shown in FIG. 7.

Female side 120 is shown in more detail in the longitudinal cross-section of FIG. 9. Female side 120 consists of a nut hub 121 which supports an annular nut 160. Nut hub 121 has a through bore 122 and a female threaded counterbore 123 on its inner end. The inner end throat of counterbore 123 has conical seal recess 124. Transverse inner shoulder 125, having a bolt circle of multiple drilled and tapped holes 126, connects conical seal recess 124 with inner end external surface 127. Moving outwardly from inner end surface 123 are externally upset cylindrical head 128, transverse outer shoulder 129, outer end external cylindrical surface 130, outer end male threads 131, and weld neck 132. Nut hub 121 is joined to another tube 113 by circumferential weld 136.

Stabbing nose 138 has through bore 139 which matches that of nut hub 121 so that the two present a smooth flow passage. Stabbing nose 138 is coaxially mounted in the inner end of nut hub 121 by male thread 140 which is threadedly engaged with the female threads of counterbore 123 of nut hub 121. The exterior leading edge of stabbing nose 138 has a large chamfer to ease stabbing of the connection.

Figure 13B:
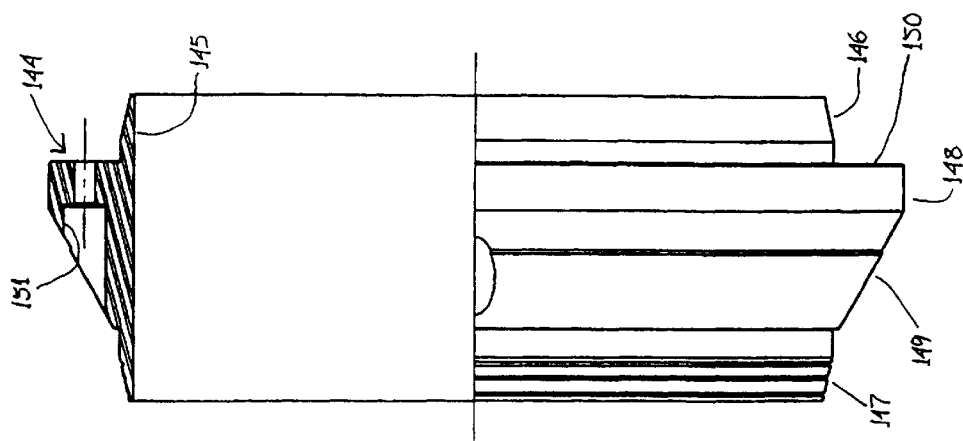
FIG. 13B shows a quarter-sectional transverse view of the seal of the connector shown in FIG. 7.
Figure 14:
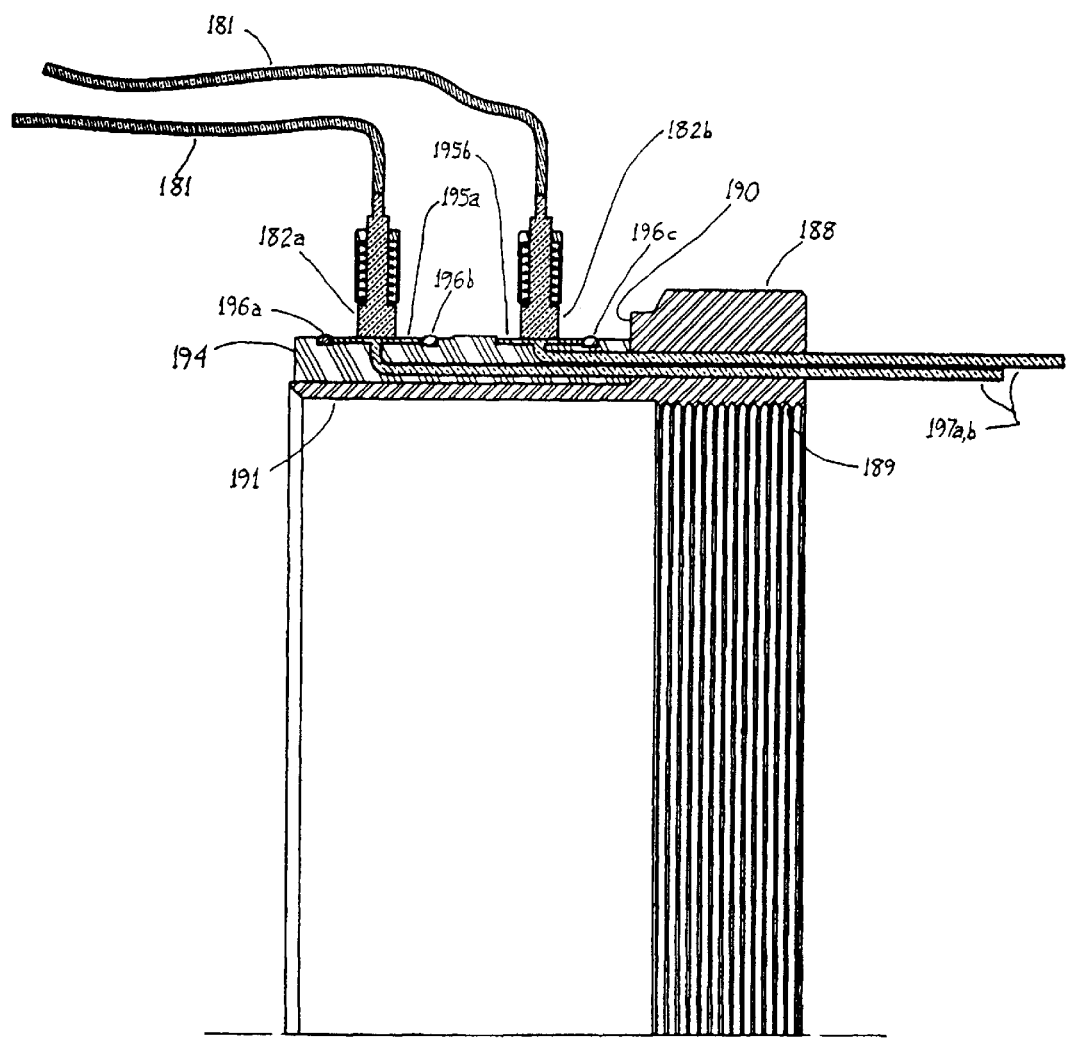
FIG. 14 shows a quarter-sectional transverse view of the seal of the electrical slip rings and related hardware used in the connector shown in FIG. 7.

Seal 144, shown mounted in FIG. 9 and in more detail in FIG. 13B, has through bore 145, first conical sealing face 146, second conical sealing face 147, and central external flange 148. Through bore 145 is sized to readily slip over the exterior cylindrical face of stabbing nose 138. First conical sealing face 146 has a taper to match that of the conical seal recess 124 of nut hub 121, but has a mild interference fit with recess 124 when fully engaged with that comating surface. The exterior of first conical sealing face 146 is smooth, since it is installed into recess 124 under controlled conditions. Second conical sealing face 147 is similarly configured to that of first conical sealing face 146, but is provided with annular grooves to permit screeding trash out of its comating conical seal recess 107 of pin 103. The annular grooves additionally permit the forming of redundant comating sealing surfaces with seal recess 107 when seal 144 is engaged with pin 103. Flange 148 has a conical face 149 with a flare angle matching that of conical abutment 108 of pin 103 so that when the two surfaces are mated, flange 148 serves as a travel limiter to prevent overstressing second conical sealing face 147 when stabbing. The obverse side of flange 148 has transverse face 150 which abuts transverse inner shoulder 125 of nut hub 121. Seal 144 is mounted to nut hub 121 by multiple screws 154 engaged through multiple counterbored holes in flange 148 and the coaxial drilled and tapped holes 126 of nut hub 121.

Annular nut 160 has, starting at its inner interior end, continuous female threads 161, undercut enlarged bore section 162, a reduced diameter guide bore section 163 which closely fits to the externally upset cylindrical head 128 of nut hub 121, an interior transverse shoulder 164, through bore 165, and outer end counterbore 166. Outwardly facing transverse shoulder 167 connects through bore 165 and outer end counterbore 166. Interior transverse shoulder 164 abuts transverse outer shoulder 129 of nut hub 121 so that the nut 160 can be used to apply compressive preload to the connector 100. The external cylindrical surface 169 of nut 160 has a central undercut heater groove 170 of constant diameter with a narrow and shallow heater wire slot 171 parallel to the nut axis connecting the heater groove to radial contactor mount through holes 172*a,b*. The contactor mount through holes 172*a,b* penetrate from the external cylindrical surface 169 to through bore 165 of nut 160. The outer end of nut 160 has externally upset outer end 174 into which multiple external drive splines 175 are cut.

Annular electrical heater sleeve 180 closely fits into external heater groove 170 of nut 160. Two heater wires 181 run from the electrical heater sleeve 180 to individual spring loaded contactors 182*a,b*, which are in turn press-fitted or otherwise suitably mounted in radial contactor mount through holes 172a,b. An annular layer of thermal insulation is provided over electrical heater sleeve 180 by external heater insulation 183, while internal nut insulation 184 lines the undercut bore section 162 of nut 160 and provides thermal insulation adjacent the electric heater sleeve 180.

Nut retainer 188 has a fairly short annular body with interior female threads 189 which are threadedly engaged with outer end male threads 131 of nut hub 121. The outer diameter of nut retainer 188 fits within the outer end counterbore 166 of nut 160. Transverse inner shoulder 190 of nut retainer 188 abuts the outwardly facing transverse shoulder 167 of nut 160 to maintain the nut on nut hub 121. Projecting inwardly from the main body of nut retainer 188 is support sleeve extension 191 which has its inner and outer diameters intermediate, between those of the main body of nut retainer 188. On the outer transverse face of nut retainer 188 are multiple spanner holes 192 to permit driving the nut retainer onto the outer end male threads 131 of nut hub 121.

Figure 18:
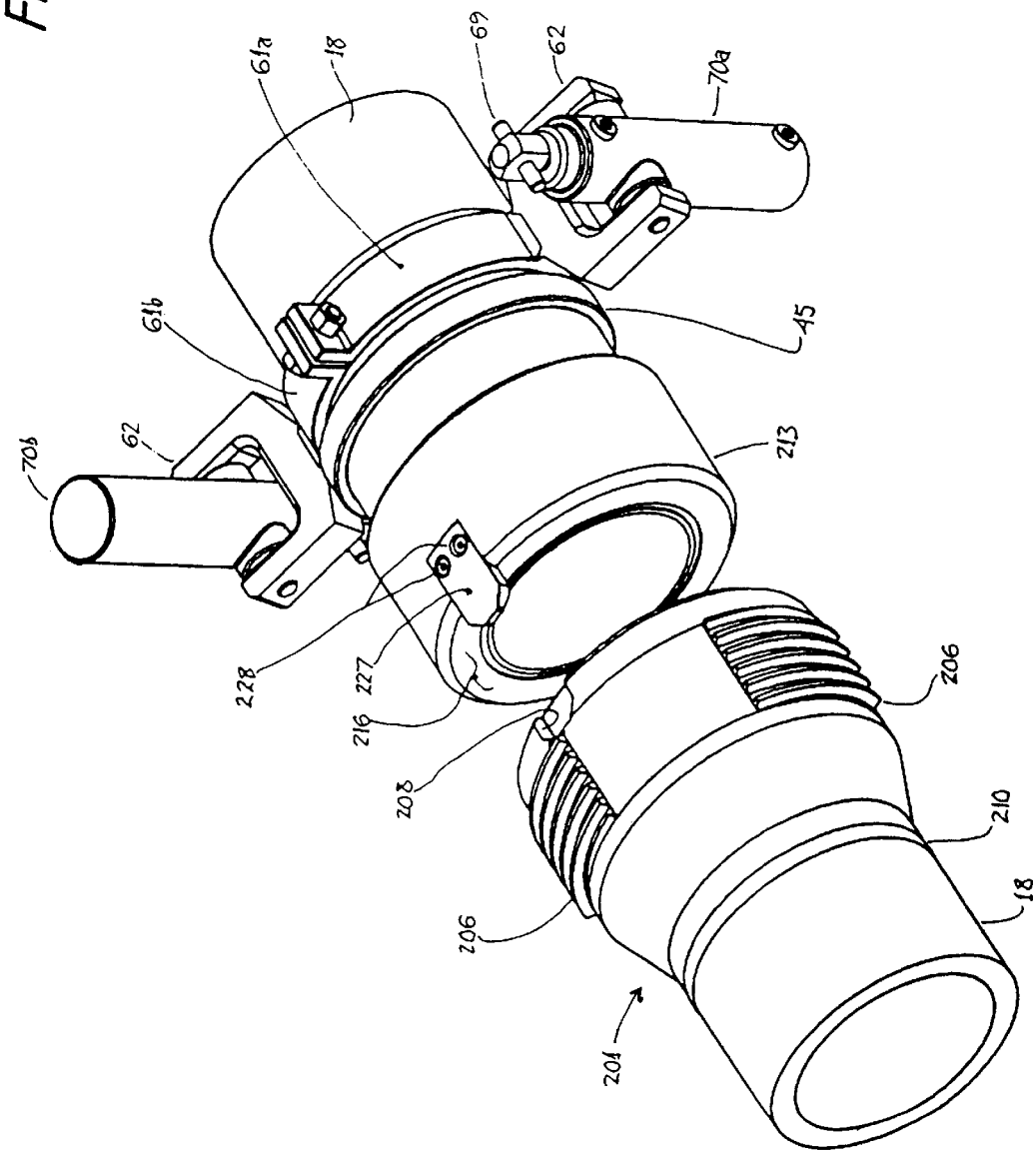
FIG. 18 is an oblique view of the connector of FIG. 15 positioned ready to stab, but with the nut of the female side of the connector removed to show the antirotational keying of the connector.

Slip ring assembly 193, best seen in FIG. 18, consists of elongated annular insulator 194 into which two copper strip conductor rings 195a,b and their associated feed wires 197a,b are molded so that the copper rings are exposed on the exterior cylindrical surface of the assembly. The bore of insulator 194 is made to closely fit on the outer diameter of support sleeve extension 191. A through hole parallel to the axis of nut retainer 188 permits feed wires 197a,b to pass through the nut retainer to be connected with an external electrical power source (not shown). Three O-rings 196a,b,c straddle the copper conductor rings 195a,b so that the rings will be electrically isolated. For sub sea use, nonconductive oil or grease will be used to fill the voids between the O-rings and the spring loaded contactors 182a,b. The copper conductor rings 195a,b are respectively positioned to make full electrical contact with spring loaded contactors 182a,b of nut 160 so that the electrical heater sleeve 180 can be supplied with electric power through feed wires 197a,b.

The second embodiment of this invention, shown in FIGS. 7–14, is operated in the following manner. FIG. 7 shows the male side 102 and the female side 120 of the connection 100 positioned to initiate stabbing. It is assumed that the male side 102 is held fixed, while the female side 120 is only constrained against rotation about its longitudinal axis. The construction of connection 100 is such that it can be stabbed in cases when the connection halves are significantly misaligned because of axial offset and inclination of the stabbing axes relative to each other.

Figure 11:
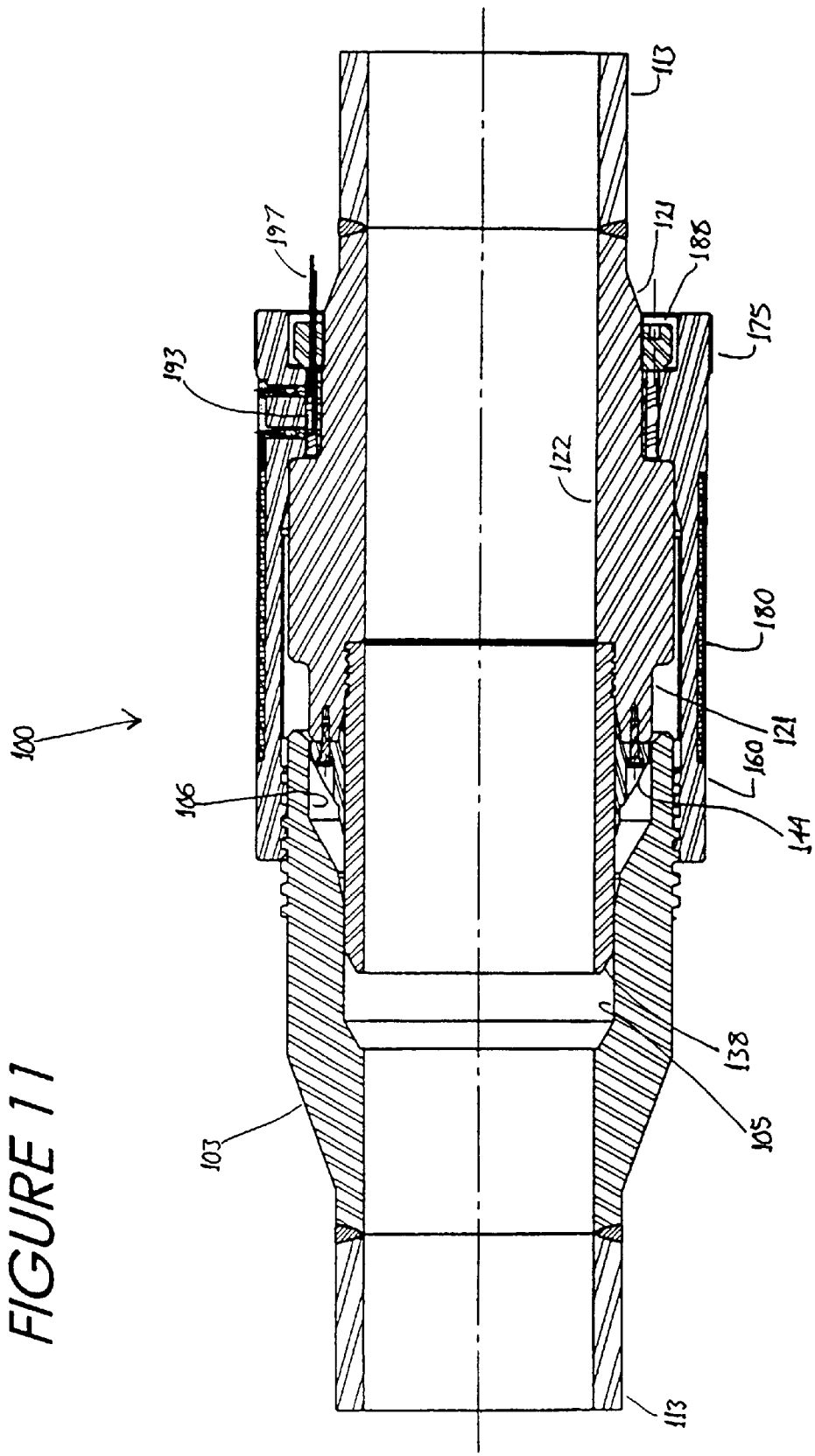
FIG. 11 shows a longitudinal sectional view of the connector shown in FIG. 7, where the stabbing is more advanced that in FIG. 10.
Figure 12:
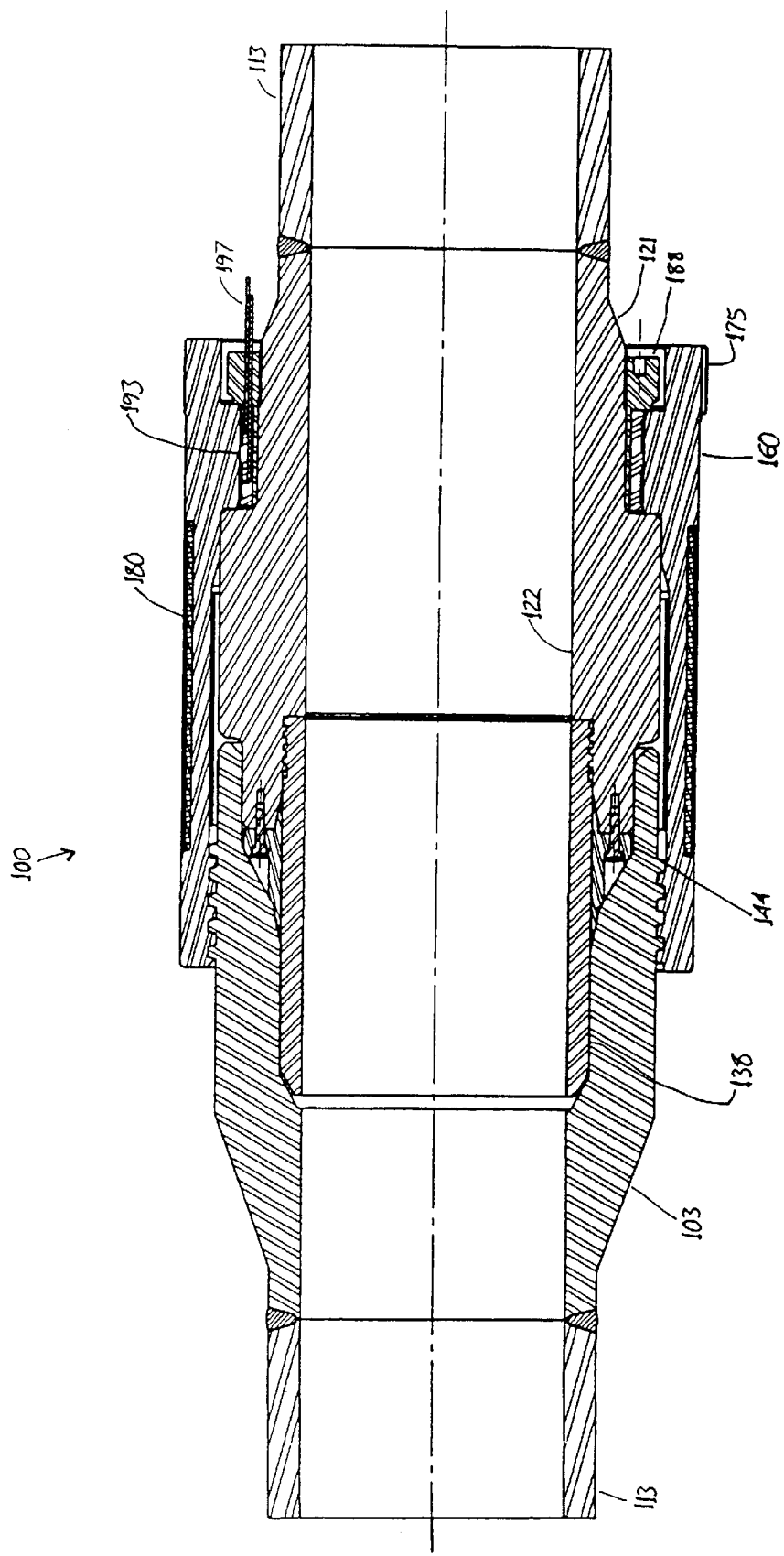
FIG. 12 shows a longitudinal sectional view of the connector shown in FIG. 7 that is fully stabbed.

The stabbing of connection 100 is sequentially shown in FIGS. 10–12. Normally, nut 160 is continuously rotated while stabbing is being conducted by torque applied to the nut through its external drive splines 175. No specific device for applying the torque to the nut is shown, but hollow spindle hydraulic motors or other types of drives are commonly available and applicable. It should be noted that the geometry shown here is used for cases when the axial misalignment between the connection halves is not excessive.

FIG. 10 shows the male 102 and female 120 halves of the connection after stabbing is initiated by causing axial movement of female side 120 so that stabbing nose 138 is caused to enter the throat of second counterbore 106 of pin 103. With the additional stabbing travel to attain the relative positions shown in FIG. 10, the throat of nut 160 is caused to slide with a loose fit over the cylindrical outer surface 109 of pin 103. Since the nut 160 is being rotated, continuation of the stabbing permits initiation of threaded engagement between female threads 161 of nut 160 and male threads 110 of pin 103.

When the connection is stabbed further to the state shown in FIG. 11, the conical face 149 of flange 148 of seal 144 has interacted with the throat of second counterbore 106 of pin 103 to compel axial alignment between the two connection halves. Opposed transverse radial reactions between firstly stabbing nose 138 and first counterbore 105 and secondly flange 148 and second counterbore 106 produce a moment which is able to act to induce any required axial alignment. Following this axial alignment of the connection, further stabbing causes second conical sealing face 147 of seal 144 to enter into and engage conical seal recess 107 of pin 103. As the second conical sealing face 147 enters the seal recess 107, the external annular grooves of seal 144 aid in screeding trash off the interface, and the multiple annular conical surfaces between the grooves offer redundant seal surfaces. Completion of the stabbing operation is shown in FIG. 12, when seal 144 is fully seated in conical seal recess 107 of pin 103. At this point the nut 160 is torqued to its initial pretension by applying torque to the external drive splines 175 by some suitable drive means. This level of pretension is sufficient to keep the seal 144 fully engaged in conical seal recess 107, but the connection is insufficiently preloaded to either avoid fatigue of the threaded portion of the connection or to transfer high bending moments across the connection.

Accordingly, after the nut 160 is initially pretensioned, electric power is applied to the electric heater sleeve via heater feed wires 197a,b and the slip ring assembly 193. Using the same methods as for the first embodiment of this invention, the nut is caused to thermally expand by an amount corresponding to a desired preload strain, the nut 160 is retorqued, power is removed from the electric heater sleeve 180, and then the nut is cooled. At this point, the connection is fully prestressed so that large bending moments can be carried and the threaded portion of the connection will not be fatigue sensitive. Similarly to the first embodiment of this invention, this embodiment can be disconnected by reheating the nut 160 to the prior setting temperature or a somewhat higher temperature and then unscrewing the nut and unstabbing the connector.

For cases when severe misalignment can be expected, both first counterbore 105 of pin 103 and stabbing nose 138 can be lengthened sufficiently to produce sufficient axial alignment between the two halves 102 and 120 of the connection before the throat of nut 160 begins to stab over pin 103. In such a case, stabbing nose 138 would already be fully engaged with first counterbore 105 sufficiently that the connector could be forced into sufficient axial alignment to allow nut 160 to clear pin 103. Provision of an enlarged bell mouth of nut 160 and increased clearance between the minor diameter of the female threads 161 of nut 160 and cylindrical outer surface 109 of pin 103 can be used to further enhance the misalignment tolerance for the connection 100. This approach is limited by the load capacity of the nut centralizing interface between guide bore section 163 of nut 160 and the externally upset cylindrical head 128 of nut hub 121.

In very severe misalignment cases where it is necessary to avoid overstress of the nut centralizing interface, interior transverse shoulder 164 of nut 160 can be set back sufficiently from the mouth of the nut to ensure that both stabbing nose 138 and flange 148 of seal 144 are fully engaged by the first counterbore 105 and the second counterbore 106 of pin 103 before the nut 160 stabs over the exterior of the pin. This arrangement permits the transverse reactions between the two interacting stabbing surfaces to produce a bending moment for aligning the connection as it is stabbed.

EXAMPLE 3

The third embodiment 200 of the pressure containing tubular connection is shown in FIGS. 15–18. This connection 200 uses several of the same components as the first embodiment, but uses a different pin and nut hub and seal type. Connection 200 utilizes a face seal which is suited for applications where the relative axial alignment and position of the two connection halves is closely controlled by guidance provided by the stabbing means. This type of connection would be suitable for shop makeup or possibly a guided remote makeup in a relatively clean environment. For this embodiment, an antirotation guide is used to effectively key the two sides of the connection together so that the face seal is not rotated across its mating surfaces. Where the components used for this third embodiment are identical to those used by the first embodiment, identical numbering and descriptions are used.

Figure 15:
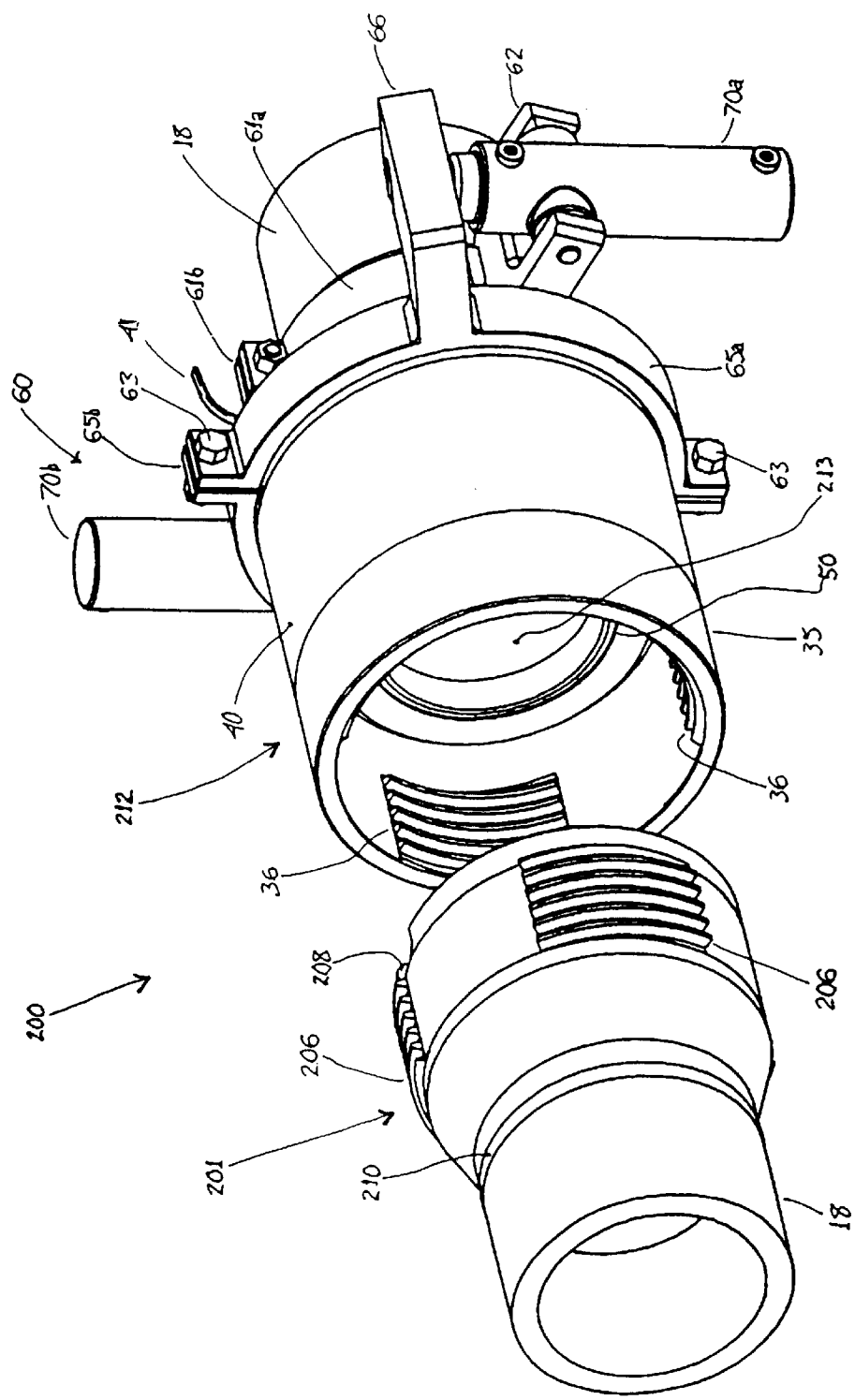
FIG. 15 shows an oblique view of a third embodiment of the connector according to the present invention.

As seen in FIG. 15, the tubular connector consists of a male side 201 and a female side 212. Further referring to FIGS. 16 and 17, the male side 201 has an externally upset male pin 202 with a through bore 203 and a transverse mating face 204 at its inner end. The outside cylindrical surface of pin 202 has male interrupted threads 206. The end of pin 202 obverse to mating face 204 is tapered to a weld neck 207. Guide pocket 208 is machined into the outer cylindrical surface of pin 202 at its junction with transverse mating face 204. Guide pocket 208 has planar sides parallel to the axis of pin 202 for the engagement of a keying element 227 carried by the female side 212 of the connection 200. Circumferential weld 210 joins weld neck 207 to tube 18. Tube 18 is shown as a short segment for purposes of illustration, but typically will be a portion of a pressure containing vessel such as a pipeline.

Figure 16:
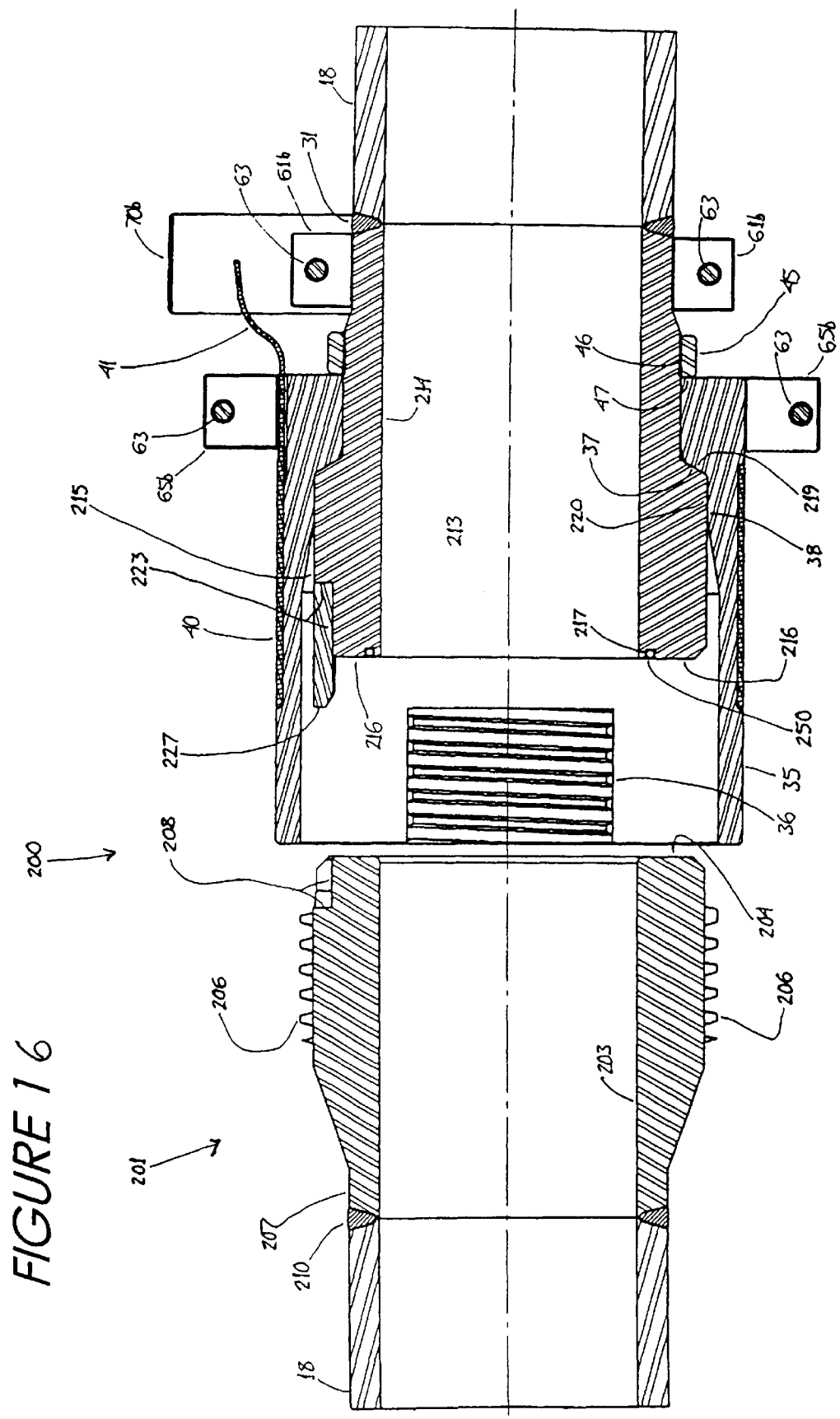
FIG. 16 is a longitudinal sectional view of the connector of FIG. 15 positioned for initiating stabbing.
Figure 17:
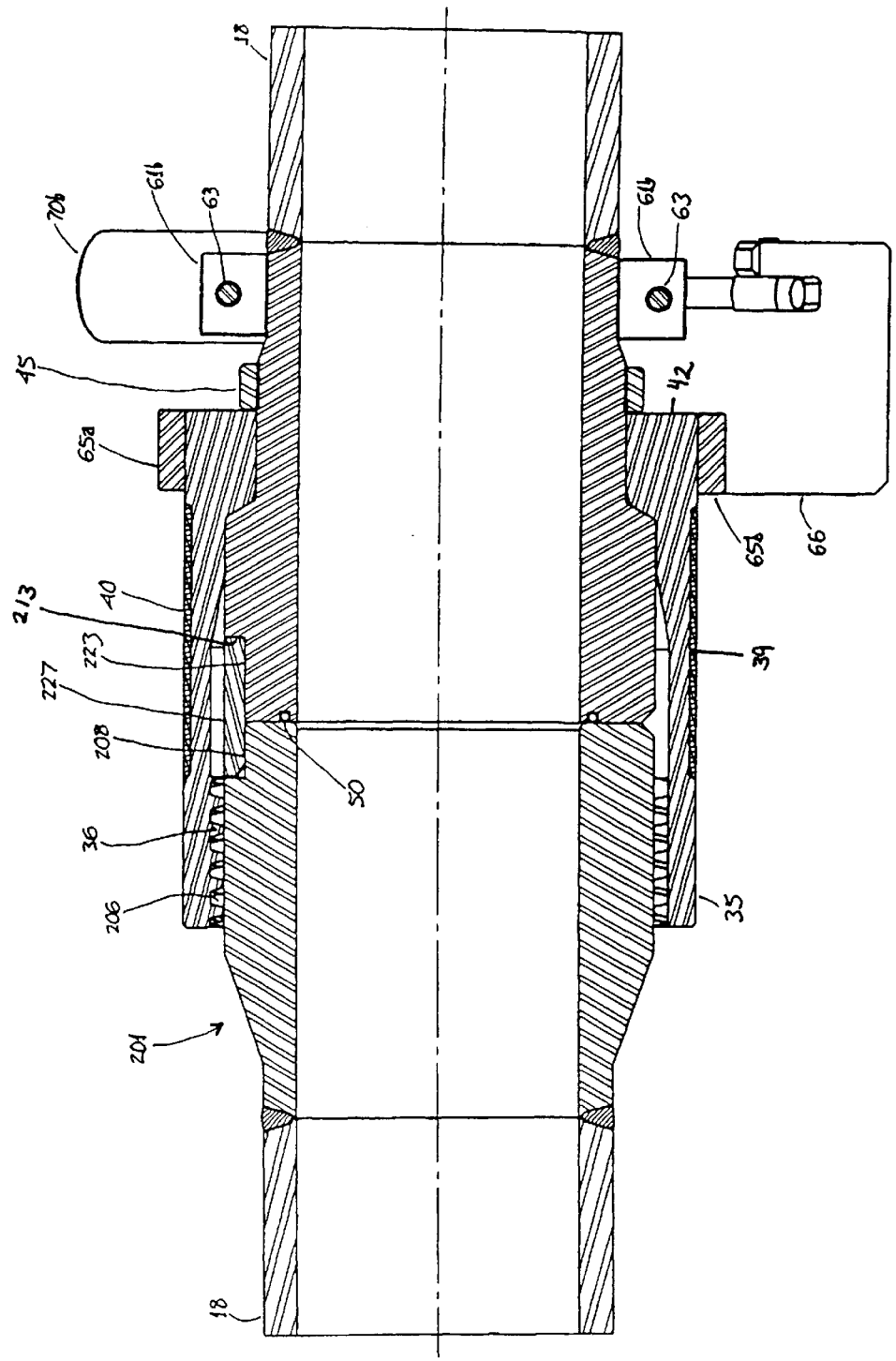
FIG. 17 is a longitudinal sectional view of the connector of FIG. 15 stabbed and tightened.

Female side 212 of the connection consists of a nut hub 213 which supports nut 35. FIG. 18 is an oblique view which shows the exterior cylindrical faces of both male side 201 and female side 212 of the connection with the connecting nut and its directly connected components removed for clarity in describing certain components. Referring to FIGS. 16–18, nut hub 213 has a through bore 214, an externally upset cylindrical head 215, and a transverse mating face 216. Seal mounting groove 217 is positioned intermediately in transverse mating face 216 and serves to mount a face seal. Obverse to mating face 216 and in order of distance from face 216 on the exterior of nut hub 213 are external conical abutment shoulder 219 and adjacent cylindrical nut guide surface 220. Adjacent to guide surface 220 are a male thread 221 and weld neck 222. Located at the intersection of the upset head 215 and transverse face 214 of nut hub 213 is guide mounting pocket 223. The sides of guide mounting pocket 223 are planar and parallel to the axis of nut hub 213. Guide mounting pocket 223 is configured to mount a keying element to prevent relative rotation of the nut hub 213 and the pin 202 when the two pieces are mated. Two drilled and tapped holes are provided in the bottom of guide mount pocket.

Guide 227 is closely fitted into guide mounting pocket 223 of nut hub 213 and mounted thereto by means of guide mounting screws 228 engaged both in countersunk holes in guide 227 and the drilled and tapped holes in the nut hub 213. Weld neck 222 of nut hub 213 is joined by circumferential weld 231 to another connecting tube 18. Note that the sizes of the weld necks and connecting tubes need not be identical for both sides of the connection.

Annular nut 35 has interrupted female threads 36 comatable with the male threads 206 of pin 202 at its outer end and interior conical shoulder 37 and guide bore 38 at its inner end. Shoulder 37 bears against corresponding shoulder 219 of nut hub 213, while bore 38 mates with guide surface 220 of nut hub 213, thereby controlling axial position and maintaining orientation of the nut 35 relative to nut hub 213. The outside diameter of nut 35 is uniform except for a central annular groove 39 which contains electrical heating element 40. A surface groove parallel to the nut axis on the inner end of nut 35 contains the connecting wires 41 of heating element 40. The outer end 42 of nut 35 is transverse to the axis of the nut.

Annular keeper ring 45 has in its bore female threads 46 which are screwed together with male thread 221 of nut hub 213 so that transverse shoulder 47 abuts inner end 42 of nut 35 and thereby retains nut 35 on nut hub 213.

Seal 50 is shown as a metal O-ring, but a metal C-ring, an elastomeric O-ring, or several other types of face seals would be suitable and fit in groove 217 of nut hub 213. Seal 50 extends slightly from groove 217 so that it will be presqueezed when it contacts and seals against transverse mating face 204 of pin 202 and the surface of seal groove 217. The abutment of transverse mating face 216 of nut hub 213 against transverse mating face 204 of pin 202 prevents overcompressing seal 50.

Torquing system 60 comprises of a pair of identical first ring clamp halves 61a,b and a pair of identical second ring clamp halves 65a,b, respectively mounted to the nut hub 213 and the nut 35, and a pair of identical hydraulic cylinders 70a,b tangentially mounted to those ring clamps. Radially projecting from each first ring clamp half 61a,b is a cylinder trunnion mounting bracket 62. The first ring clamp halves 61a,b are bolted together by a pair of bolts 63 and nuts 64 through holes on the radially projecting ears of the ring clamp so that the clamp halves. are rigidly fixed to nut hub 213 by friction. If necessary, interlocking keys, bolts, welding, or other means can be employed to enhance the torque transmission capabilities of the joint between the clamp halves and the nut hub. Similarly for each second ring clamp half 65a,b, a radially projecting rod pin mount 66 is attached. The second ring clamp halves 65a,b are also connected by a pair of bolts 63 and nuts 64 positioned in holes in radially projecting ears so that they tightly grip the nut 35. Again, the joint between the second ring clamp halves 65a,b and nut 35 may be enhanced by welding, keys, or other means. Cylinders 70*a,b* are each trunnion mounted in a trunnion mounting bracket 62 on the first ring clamp halves 61*a,b* and have a pin 69 coupling their rod ends to rod pin mount 66 of the second ring clamp halves 65*a,b*. The cylinders 70*a,b* are thus positioned so that when their rods are extended, the nut 35 is rotated to cause the nut to tighten, while when their rods are retracted, the nut is rotated to cause it to loosen.

The third embodiment 200 is operated in the following manner. Male side 201 and female side 212 are brought into approximate axial alignment as shown in FIG. 15 and then coaxially stabbed together. This connection 200 is able to tolerate only very minor axial offset and axial angular misalignment. Use of suitable stabbing means familiar to those involved with the field of tubular connections is assumed.

The male side 201 of the connection is assumed to be fixed, while the female side 212 is assumed to be guided so that its axial position and alignment are reliably maintained within acceptable limits. Unlike the other two embodiments of this invention, the hub of the reciprocating side of the connection is not constrained against rotation. Because interrupted threads 206 and 36 are used, the connection of this third embodiment 200 can be fully stabbed before nut 35 is rotated. Nut 35 need only rotate a fraction of a revolution to fully engage the interrupted threads of the connection. When the transverse mating faces 204 and 216 are brought into sufficiently close proximity, the face of seal 50 engages and sealingly mates with both transverse mating face 204 of pin 202 and the inside transverse face of seal mounting groove 217 of nut hub 213 to effectively seal the connection. The sealing means used for this embodiment is suitable for relatively clean operating environments.

After the male side 201 and the female side 212 of the connection 200 are substantially or fully stabbed together, hydraulic pressure is applied to cylinders 70*a,b* to cause their rods to extend and thereby rotate the nut 35 about nut hub 213 so that the female interrupted threads 36 of nut 35 are caused to engage the male interrupted threads 206 of pin 202. The limited amount of rotation of the nut does not damage the heater connecting wires 41, since they are provided with sufficient slack and are routed away from moving parts which might damage them. After this initial rotation, the connection is in a state of initial makeup. However, due to the limited size and moment arm of the hydraulic cylinders, the axial preload between transverse mating faces 204 and 216 of, respectively, the male 201 and female 212 sides of the connection is insufficient to permit the connection to carry substantial bending moments. Additionally, the threads 206 and 36 will be prone to fatigue damage if not preloaded. Accordingly, electric power is applied to the heating element 40 through connecting wires 41 so that the tensioned tubular section adjacent the heating element between female threads 36 and interior shoulder 37 of nut 35 is heated and thereby expanded. The heating is done until a desired temperature rise and axial extension of the nut 35 is achieved. Although the means is not shown, it is assumed that a thermocouple or thermistor or similar device is emplaced on the heated portion of nut 35 so that its actual temperature may be monitored and power removed from the heating element 40 when the desired temperature is achieved. Typically, the temperature and its associated amount of thermal strain (i.e., extension) are chosen to be equal to approximately the strain which would be produced if the nut were torqued until its axial tension were a desired percentage (say, half) of the yield stress for the nut. After attainment of this desired temperature, the hydraulic cylinders 70*a,b* are repressured to retorque the threads 206 and 36, which are loosened when the nut 35 is heated. When the nut is cooled after the electric power to heating element 40 is turned off, the connection 200 will be fully tightened and properly pretensioned so that fatigue is avoided and large bending moments can be transmitted across the connection. Following the cooling and pretensioning of the connection, the connection is able to hold pressure.

Connection 200 is disconnected by first applying heat to nut 35 with the heating element 40 so the nut reaches the same or a somewhat higher temperature than used in tightening. After the nut is stretched sufficiently to reduce the friction on the threads 206 and 36, hydraulic pressure is applied to cause cylinders 70*a,b* to fully retract to thereby fully disconnect the interrupted threads. At that point, the connection can be unstabbed.

ADVANTAGES OF THE INVENTION

The method and apparatus of this invention permit remotely making structurally strong and robust pressure containing tubular connections. In particular, the connections can be made without relying on the very large makeup and breakout torques required by other types of connections. The connection devices shown are configured to be remotely mated with different degrees of stabbing misalignment and environmental cleanliness. The third embodiment is for very minor misalignment and relatively clean conditions, the first embodiment for a medium level of misalignment and dirty conditions, while the second embodiment is configured to deal with very significant misalignments and dirty conditions. Each of the embodiments is configured to be useable with very reliable metal-to-metal sealing. For each embodiment, additional reliability is easy to provide by means of adding a redundant metal-to-metal or elastomeric face seal on the transverse mating faces. If desired, the stabbing nose of the second embodiment can be provided with a seal for circumferential sealing in an annular groove.

The reliability of pretensioning of the connections of this invention is significantly above that provided by traditional torquing procedures such as "turn-of-nut", or use of torque wrenches. Conventional methods are dependent upon accurate knowledge of the nut-to-hub friction, but this information cannot be reliably known, due to variations in surface finish and wear and lubrication. For the case of large connections which are commonly used for tubular joints, hydraulic procedures comparable to stud tensioning would be very expensive, heavy, and unreliable over time due to elastomeric seal deterioration. The tensioning method described herein offers much improved reliability in a physically compact size without difficult or expensive manufacturing and involved procedures. The makeup and breakout procedures are insensitive and exceptionally simple and easy to control remotely. Further, the operational procedures including heating can be performed rapidly, even in water.

It may be understood readily by those skilled in the art that various modifications may be made to the embodiments and methods described herein without departing from the spirit of the invention. Further, various aspects of the different embodiments can be combined without departing from the spirit of the invention. For instance, the stabbing nose of the second embodiment could also be used with the face seal of the third embodiment, or redundant seals or different types of seals could be utilized. Also, many different types of torquing means could be applied with this invention. Any of the embodiments could utilize the conventional threads of the second embodiment or the interrupted threads of the first and third embodiments.

It may also be readily understood that this means of establishing axial preload in a connection can also be used for connections which do not contain pressure merely by eliminating provisions for seals in the designs.

Having described several embodiments securing pressure-containing equipment, it is believed that other modifications, variations, and changes will be suggested to those skilled in the art in view of the description set forth above. It is therefore to be understood that all such variations, modifications, and changes are believed to fall within the scope of the invention as defined in the appended claims.

What is claimed is:

1. A tubular connector comprising:
a first hub having a through bore, an interior end and an external surface, wherein the first hub has a plurality of threads on a portion of the external surface;
a second hub having a through bore and a first end and a second end;
a coupling nut coaxially mounted on the second hub, wherein the coupling nut has a plurality of internal threads adapted to threadedly engage the threads on the external surface of the first hub, wherein tightening the coupling nut forces the interior end of the first hub towards the first end of the second hub;
a keeper ring mounted on the second hub adjacent to the coupling nut to limit axial movement of the coupling nut along a length of the second hub toward the second end of the second hub;
a seal having a through bore, wherein the seal is mounted on the first end of the second hub and prevents ingress or egress of fluid between the interior end of the first hub and the first end of the second hub when the coupling nut is tightened to sufficiently compress the seal between the interior end of the first hub and the first end of the second hub to sealingly engage the interior end of the first hub and the first end of the second hub; and
heating means for heating the coupling nut;
whereby when the coupling nut is heat-expanded less torque is required to tighten or loosen the coupling nut.

2. The tubular connector of claim 1, wherein the through bores of the first hub, the second hub, and the seal are coaxial and have substantially the same internal diameter.

3. The tubular connector of claim 2, wherein the first and second hubs are each connected to a length of tubing having substantially the same internal diameter as the through bore of the connected hub.

4. The tubular connector of claim 1, wherein the seal has a first external conical sealing face and a second external conical sealing face, the first sealing face sealingly comateable with a first conical recess at the interior end of the first hub and the second sealing face sealingly comateable with a second conical recess at the first end of the second hub.

5. The tubular connector of claim 4, wherein the first sealing face is pressure biased by pressures in the seal through bore against the first conical recess of the first hub and the second sealing face is pressure biased by pressures in the seal through bore against the second conical recess of the second hub.

6. The tubular connector of claim 4, wherein the first sealing face has at least one annular groove.

7. The tubular connector of claim 1, wherein the seal is constructed of an elastomeric or metal material.

8. The tubular connector of claim 1 further comprising torquing means for tightening or loosening the coupling nut.

9. The tubular connector of claim 1 further comprising double-acting hydraulic means for tightening or loosening the coupling nut.

10. The tubular connector of claim 9, wherein the hydraulic means is at least one hydraulic cylinder.

11. The tubular connector of claim 1 wherein the heating means is positioned on an external surface of the coupling nut distal to a section of the external surface directly opposed to the internal threads.

12. The tubular connector of claim 1 further comprising an insulative covering for the heating means.

13. The tubular connector of claim 1 further comprising heating control means for regulating the heating means.

14. The tubular connector of claim 1 further comprising heat sensing means for accurately determining the temperature of the heated nut for implementing control of the nut temperature.

15. The tubular connector of claim 14, wherein the heat sensing means is a thermocouple, thermistor or heat-resistance device.

16. The tubular connector of claim 1, wherein the threads on the first hub and the internal threads of the coupling nut are interrupted threads.

17. The tubular connector of claim 16, wherein there is an equal number of thread interrupts and thread starts, wherein the thread interrupts are at least as long as the threads.

18. A tubular connector comprising:
(a) a first hub having a through bore, a first end having a first conical recess, and an externally threaded exterior section proximal the first end;
(b) a second hub having a through bore, an outer surface, an interior end having a second conical recess, and a shoulder opposed to the interior end;
(c) a coupling nut having
an internally threaded proximal end adapted to threadedly engage the externally threaded exterior section of the first hub, and
an internal shoulder distal to the threaded proximal end engaged with the shoulder of the second hub to provide axial position control for said coupling nut, wherein tightening the coupling nut forces the first end of the first hub towards the interior end of the second hub;
(d) a seal mounted on the first end of the second hub, the seal having a through bore, a first external sealing face comateable with the first conical recess, and a second external sealing face comateable with the second conical recess;

(e) a heating element attached to said coupling nut; and
(f) a hydraulic torquing mechanism for transmitting torque to the coupling nut to tighten or loosen the nut;
whereby when the heating element increases the temperature of the coupling nut sufficiently the coupling nut is expanded and less torque is needed to achieve a predetermined pretensioning of the tubular connector.

19. The tubular connector of claim 18, wherein the torquing means is a double-acting hydraulic cylinder.

20. The tubular connector of claim 18, wherein the torquing means comprises a first element attached to the coupling nut and a second element attached to the second hub.

21. The tubular connector of claim 18 wherein the heating element is positioned on an external surface of the coupling nut between the internally threaded proximal end and the internal shoulder.

22. The tubular connector of claim 18 further comprising an insulative covering for the heating element.

23. The tubular connector of claim 22, wherein the first length of tubing, the second length of tubing, and the through bore of the seal have substantially equal internal diameters.

24. The tubular connector of claim 18, wherein the heating element is electrically powered.

25. The tubular connector of claim 18, wherein the first hub has a second end attached to a first length of tubing and the second hub has an exterior end attached to a second length of tubing.

26. The tubular connector of claim 18 further comprising heating control means for regulating the heating element.

27. The tubular connector of claim 18 further comprising heat sensing means for accurately determining the temperature of the heated nut for implementing control of the nut temperature.

28. The connector of claim 27, wherein the heat sensing means is a thermocouple, thermistor or heat-resistance device.

29. The tubular connector of claim 18, wherein the threads on the first hub and the internal threads of the coupling nut are interrupted threads having an equal number of thread interrupts and thread starts with the thread interrupts at least as long as the threads.

30. A tubular connector comprising:
(a) a first hub having a through bore, a first end having a sealing surface transverse to the through bore, and a plurality of external threads proximal to the sealing surface;
(b) a second hub having a through bore, an outer surface, and an interior end having a sealing surface transverse to the through bore;
(c) a coupling nut having a plurality of internal threads at a proximal end, the threads adapted to threadedly engage the external threads of the first hub;
(d) mounting means for coaxially mounting said coupling nut onto the outer surface of the second hub, said mounting means for providing axial and radial position control for said coupling nut;
(e) selectably controllable heating means for heating a length of said coupling nut, said heating means positioned distal to said proximal end;
(f) seal means for sealingly engaging the sealing surfaces of said first and second hubs when said internal threads of the coupling nut sufficiently engage the external threads of the first hub; and
(g) torquing means for transmitting torque to an external surface of said nut to tighten or loosen said nut, wherein said torquing means comprises two torquing elements, said torquing elements including a ring clamp and a pair of hydraulic cylinders, wherein one torquing element is mounted to the second hub and one torquing element is mounted to the coupling nut;
whereby a pressure-containing connection is effectuated between the first and second hubs by a combination of applying torque to said nut and applying and then removing heat from said nut.

31. The tubular connector of claim 30, wherein the through bores of the first and second hubs are coaxial and have substantially the same internal diameter.

32. The tubular connector of claim 30, wherein the first and second hubs are each connected to a length of tubing having substantially the same internal diameter as the through bore of the connected hub.

33. The tubular connector of claim 30, wherein the sealing means is an elastomeric or metal seal.

34. The tubular connector of claim 30, wherein the heating means is positioned on an external surface of the coupling nut distal to the proximal end.

35. The tubular connector of claim 30 further comprising an insulative covering for the heating means.

36. The tubular connector of claim 30 further comprising heating control means for regulating the heating means.

37. The tubular connector of claim 30 further comprising heat sensing means for accurately determining the temperature of the heated nut for implementing control of the nut temperature.

38. The tubular connector of claim 37, wherein the heat sensing means is a thermocouple, thermistor or heat-resistance device.

39. The tubular connector of claim 30, wherein the threads on the first hub and the internal threads of the coupling nut are interrupted threads.

40. The tubular connector of claim 39, wherein the threads on the first nut and the coupling nut have an equal number of thread interrupts and thread starts.

41. A method of prestressing a threaded connection comprising:
(a) attaching a tubular connector to two lengths of tubing, the connector comprising:
a first hub having a through bore, an interior end and an external surface, wherein the first hub has a plurality of external threads on a portion of the external surface and is attached to a first tubing;
a second hub having a through bore and a first end and is attached to a second tubing;
a coupling nut coaxially mounted on the second hub to limit axial movement of the coupling nut along a length of the second hub, wherein the coupling nut has a plurality of internal threads adapted to threadedly engage the threads on the external surface of the first hub, wherein tightening the coupling nut forces the interior end of the first hub towards the first end of the second hub;

a seal having a through bore, wherein the seal is mounted on the first end of the second hub;

a hydraulic torquing mechanism connected to the coupling nut; and a heating element for heating the coupling nut;

(b) aligning the internal threads of the coupling nut for engagement with the external threads of the first hub;

(c) activating the torquing mechanism to apply an initial torque to the coupling nut to engage the external and internal threads to form a connection between the first hub and the coupling nut with a first level of tension on the connection;

(d) heating the coupling nut to a set temperature;

(e) activating the torquing mechanism to apply a secondary torque to the coupling nut to provide a second level of tension on the connection; and (f) allowing the coupling nut to achieve ambient temperature to achieve an increased third level of tension on the connection.

42. The method of claim 41, wherein a double-acting hydraulic means is used to apply torque to the coupling nut.

43. A method of establishing a pressure-containing threaded connection comprising:

(a) connecting a tubular connector to two lengths of tubing, the connector comprising:

a first hub having a through bore, a first end having a sealing surface coaxial with the through bore, a second end attached to a first length of tubing, and a plurality of interrupted external threads proximal to the sealing surface;

a second hub having a through bore, an outer surface, an interior end having a sealing surface coaxial with the through bore, and an exterior end attached to a second length of tubing;

a coupling nut having a plurality of interrupted internal threads at a proximal end, the threads adapted to threadedly engage the external threads of the first hub;

mounting means for coaxially mounting said coupling nut onto the outer surface of the second hub, said mounting means for providing axial position control for said coupling nut;

selectably controllable heating means for heating a length of said coupling nut;

a seal having a through bore, the seal mounted on the sealing surface of the second hub; and a hydraulic torquing mechanism for transmitting torque to an external surface of said nut to tighten or loosen said nut;

(b) inserting the internal threads of the coupling nut into the thread interrupts of the external threads of the first hub;

(c) aligning the internal threads of the coupling nut with the external threads of the first hub;

(d) activating the torquing mechanism to apply an initial torque to the coupling nut to engage the external and internal threads to form a connection between the first hub and the coupling nut with a first level of tension on the connection;

(e) heating the coupling nut to a predetermined temperature;

(f) activating the torquing mechanism to apply a secondary torque to the coupling nut to provide a second level of tension on the connection; and (f) allowing the coupling nut to achieve ambient temperature to achieve an increased third level of tension on the connection sufficient to force the seal means to engage the sealing surfaces of the first and second hubs and prevent the egress or ingress of fluid through the seal means.

44. A tubular connector comprising:

a first hub having a through bore, an interior end, an external surface, a first counterbore having a first inner diameter, a conical abutment, a second counterbore opening to the interior end of the first hub and having a second inner diameter wherein the second inner diameter is larger than the first inner diameter, a sealing face, and a plurality of threads on a portion of the external surface;

a second hub having a through bore, a first end, a second end, a cylindrical stabbing nose having an outer diameter sufficient to provide a slip fit into the first inner diameter of the first counterbore of the first hub, a sealing face, and a cylindrical inner section having an outer diameter sufficient to provide a slip fit into the second counterbore of the first hub;

a coupling nut coaxially mounted on the second hub, wherein the coupling nut has a plurality of internal threads adapted to threadedly engage the threads on the external surface of the first hub, wherein tightening the coupling nut forces the interior end of the first hub towards the first end of the second hub;

a keeper ring mounted on the second hub adjacent to the coupling nut to limit axial movement of the coupling nut along a length of the second hub toward the second end of the second hub;

an annular seal having a through bore, wherein the seal is mounted on the first end of the second hub and prevents ingress or egress of fluid between the interior end of the first hub and the first end of the second hub when the coupling nut is tightened to sufficiently compress the seal between the interior end of the first hub and the first end of the second hub; and heating means for heating the coupling nut;

whereby when the hubs of the connector are assembled the interaction of the counterbores and conical abutment of the first hub with the stabbing nose and the cylindrical inner section of the second hub coact to cause axial alignment of the connector and whereby when the coupling nut is heat-expanded less torque is required to tighten or loosen the coupling nut.

* * * * *